United States Patent
Akimoto et al.

(10) Patent No.: US 9,943,909 B2
(45) Date of Patent: Apr. 17, 2018

(54) CARBON-COATED METAL POWDER, CONDUCTIVE PASTE CONTAINING CARBON-COATED METAL POWDER AND MULTILAYER ELECTRONIC COMPONENT USING SAME, AND METHOD FOR MANUFACTURING CARBON-COATED METAL POWDER

(71) Applicant: Shoei Chemical Inc., Tokyo (JP)

(72) Inventors: Yuji Akimoto, Tosu (JP); Hideki Tanaka, Tosu (JP); Mineto Iwasaki, Tosu (JP); Akiko Matsuo, Tosu (JP)

(73) Assignee: SHOEI CHEMICAL INC., Shinjuku-ku, Tokyo (JP)

( * ) Notice: Subject to any disclaimer, the term of this patent is extended or adjusted under 35 U.S.C. 154(b) by 72 days.

(21) Appl. No.: 15/037,943

(22) PCT Filed: Jun. 17, 2015

(86) PCT No.: PCT/JP2015/067401
§ 371 (c)(1),
(2) Date: May 19, 2016

(87) PCT Pub. No.: WO2015/194579
PCT Pub. Date: Dec. 23, 2015

(65) Prior Publication Data
US 2016/0271700 A1 Sep. 22, 2016
US 2018/0001388 A9 Jan. 4, 2018

(30) Foreign Application Priority Data

Jun. 20, 2014 (JP) .................. 2014-127136

(51) Int. Cl.

| | | |
|---|---|---|
| B22F 9/14 | (2006.01) | |
| B22F 1/02 | (2006.01) | |
| B22F 9/12 | (2006.01) | |
| B22F 9/04 | (2006.01) | |
| C22C 9/00 | (2006.01) | |
| C22C 5/06 | (2006.01) | |
| C22C 19/00 | (2006.01) | |
| B22F 1/00 | (2006.01) | |
| H01G 4/008 | (2006.01) | |
| B23K 1/00 | (2006.01) | |
| H01F 27/28 | (2006.01) | |

(Continued)

(52) U.S. Cl.
CPC ............. *B22F 9/14* (2013.01); *B22F 1/0003* (2013.01); *B22F 1/0014* (2013.01); *B22F 1/0074* (2013.01); *B22F 1/0085* (2013.01); *B22F 1/02* (2013.01); *B22F 9/04* (2013.01); *B22F 9/12* (2013.01); *B23K 1/0016* (2013.01); *B23K 35/025* (2013.01); *C22C 5/06* (2013.01); *C22C 9/00* (2013.01); *C22C 19/002* (2013.01); *C22C 19/03* (2013.01); *H01F 27/2804* (2013.01); *H01G 4/008* (2013.01); *H01G 4/0085* (2013.01); *B22F 2301/10* (2013.01); *B22F 2301/15* (2013.01); *B22F 2302/40* (2013.01); *B22F 2302/45* (2013.01); *B22F 2303/40* (2013.01); *B22F 2998/10* (2013.01); *B22F 2999/00* (2013.01); *B23K 35/3033* (2013.01); *B23K 35/3612* (2013.01); *B23K 35/3613* (2013.01); *H01F 41/041* (2013.01); *H01F 2027/2809* (2013.01); *H01G 4/012* (2013.01); *H01G 4/30* (2013.01)

(58) Field of Classification Search
None
See application file for complete search history.

(56) References Cited

U.S. PATENT DOCUMENTS

2005/0121656 A1* 6/2005 Choi ................... H01B 1/24
252/503
2009/0297709 A1 12/2009 Zaitsev et al.

FOREIGN PATENT DOCUMENTS

| JP | 63-20032 A | 1/1988 |
|---|---|---|
| JP | 2005-008960 A | 1/2005 |

(Continued)

OTHER PUBLICATIONS

Taiwan Office Action and Search Report from corresponding application No. 104119690 with partial English translation, dated Nov. 8, 2016 (4 pages).

(Continued)

*Primary Examiner* — Sheeba Ahmed
(74) *Attorney, Agent, or Firm* — Flynn, Thiel, Boutell & Tanis, P.C.

(57) ABSTRACT

A carbon-coated metal powder having few impurities, a narrower particle size distribution, and sintering properties is particularly suitable as a conductive powder of a conductive paste for forming internal conductors in a ceramic multilayer electronic component obtained by co-firing multilayered ceramic sheets and internal conductor layers; a conductive paste containing the carbon-coated metal powder; a multilayer electronic component using the conductive paste; and a method for manufacturing the carbon-coated metal powder. The carbon-coated metal powder has specific properties in TMA or ESCA measurements. The carbon-coated metal powder can be obtained by melting and vaporizing a metallic raw material in a reaction vessel, conveying the generated metal vapor into a cooling tube and rapidly cooling the metal vapor by endothermically decomposing a carbon source supplied into the cooling tube, and forming a carbon coating film on metal nuclei surfaces in parallel with generation of the metal nuclei.

16 Claims, 15 Drawing Sheets

(51) Int. Cl.
    *B23K 35/02*      (2006.01)
    *C22C 19/03*      (2006.01)
    *H01G 4/012*      (2006.01)
    *B23K 35/30*      (2006.01)
    *B23K 35/36*      (2006.01)
    *H01F 41/04*      (2006.01)
    *H01G 4/30*      (2006.01)

(56) References Cited

FOREIGN PATENT DOCUMENTS

| | | |
|---|---|---|
| JP | 2005-154904 A | 6/2005 |
| JP | 2008-308733 A | 12/2008 |
| JP | 2010-212580 A | 9/2010 |
| JP | 2013-064198 A | 4/2013 |
| JP | 2013-091824 A | 5/2013 |
| JP | 2014-029012 A | 2/2014 |
| JP | 2014-029013 A | 2/2014 |
| KR | 10-2013-0061634 A | 6/2013 |

OTHER PUBLICATIONS

English language International Search Report for PCT/JP2015/067401 (2 pgs).
Korean Office Action issued in corresponding application No. 10-2016-7013609, dated Jul. 26, 2016, with English-language Concise Explanation of Relevance (7 pages).

\* cited by examiner

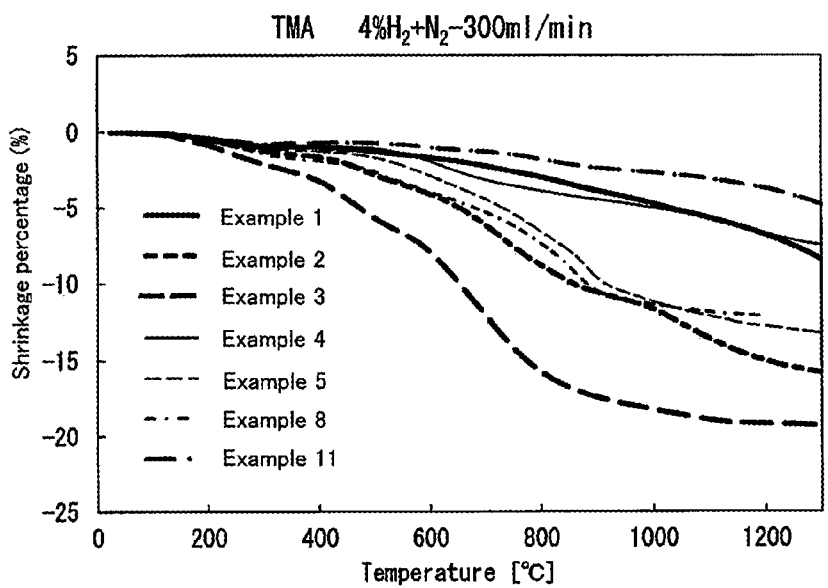
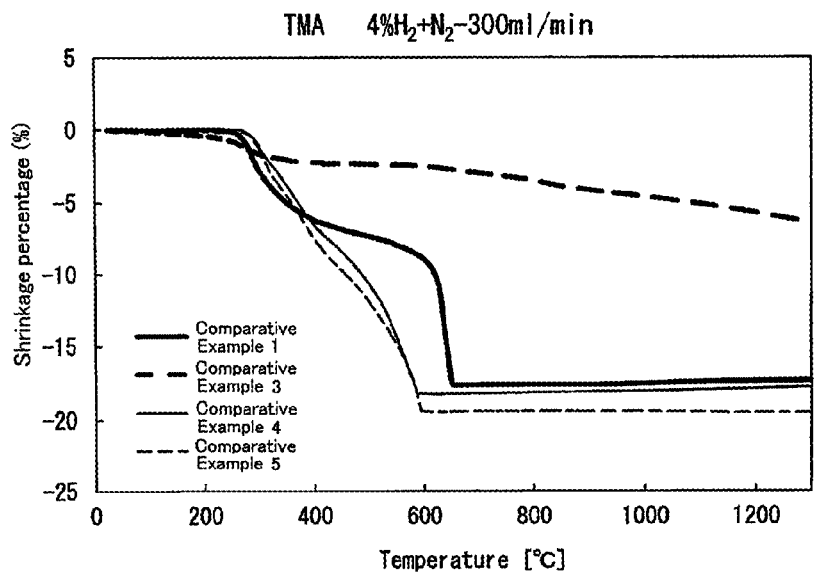

CARBON-COATED METAL POWDER, CONDUCTIVE PASTE CONTAINING CARBON-COATED METAL POWDER AND MULTILAYER ELECTRONIC COMPONENT USING SAME, AND METHOD FOR MANUFACTURING CARBON-COATED METAL POWDER

TECHNICAL FIELD

The present invention relates to a carbon-coated metal powder, which is particularly advantageous for forming for example, internal conductors (internal electrodes), terminal electrodes, etc. of multilayer electronic components, a conductive paste containing the carbon-coated metal powder, and a multilayer electronic component using the same.

The present invention also relates to a method for manufacturing a carbon-coated metal powder, and more particularly to a method for melting and vaporizing a metal material, rapidly cooling the metal vapor by endothermic decomposition of a supplied carbon source, and forming a carbon coating film on the surfaces of metal nuclei in parallel with generation of the metal nuclei.

BACKGROUND ART

Ceramic multilayer electronic components, such as multilayer capacitors and multilayer inductors, and ceramic multilayer substrates are generally manufactured by alternately laminating a plurality of unfired ceramic green sheets of dielectric, magnetic materials or the like and internal conductive paste layers, and co-firing the laminate at a high temperature. Noble metals have been mainly used for the internal conductors, but base metal materials such as nickel, etc. have recently found wide application.

When nickel particles are fired in a non-oxidizing atmosphere such as an inert atmosphere or reducing atmosphere to prevent oxidation, sintering occurs at an early stage, and sintering and shrinkage start at a low temperature of 400° C. or less even when single-crystal particles with a comparatively low activity are used. Meanwhile, sintering of ceramic layers generally starts at a much higher temperature than the above temperature. For example, barium titanate starts sintering at about 1200° C. A problem occurring because of such a difference in shrinkage behavior is that when an internal conductive paste containing a nickel powder and ceramic sheets are co-fired, the ceramic layers do not shrink together with the nickel films, and therefore delamination or cracks can easily occur between the internal conductor layers and ceramic layers.

With one of the suggested methods for solving the aforementioned problem, the sintering initiation temperature of nickel particles is increased, for example, by coating carbon on the nickel particles or incorporating carbon therein (PTL (patent literature) 1 and PTL 2). PTL 1 discloses a metal powder in which a carbon coating film is formed on the nickel powder surface by producing a nickel powder by a vapor phase hydrogen-reduction method, or the like, and then bringing the nickel powder into contact with a hydrocarbon gas at 300° C. to 600° C. PTL 2 discloses a carbon-containing nickel particle powder obtained by heating a dispersion liquid containing nickel particles and a polyol at 150° C. to 350° C. to cause carbon adsorption on the surfaces of nickel particles and/or permeation of carbon into the nickel particles.

Further, surface modification by coating a carbon film on fine metal particles of nickel, or the like, which are used in sensors or magnetic materials, this application being entirely different from that described hereinabove, is also known. For example, PTL 3 and PTL 4 disclose producing nickel particles coated with carbon by cooling a metal vapor, which is generated by melting and vaporizing a metallic raw material, under an atmosphere including a hydrocarbon gas such as methane gas.

CITATION LIST

Patent Literature

PTL 1: Japanese Patent Application Publication No. 2005-008960.
PTL 2: Japanese Patent Application Publication No. 2005-154904.
PTL 3: Japanese Patent Application Publication No. S63-020032.
PTL 4: Japanese Patent Application Publication No. 2010-212580.
PTL 5: Japanese Patent Application Publication No. 2014-029012.
PTL 6: Japanese Patent Application Publication No. 2014-029013.

SUMMARY OF INVENTION

Technical Problem

However, the following problems are associated with the above-described conventional techniques.

With the manufacturing methods disclosed in PTL 1 and PTL 2, a nickel powder is generated in advance, and a carbon film is coated on the generated nickel powder or carbon is introduced therein. Therefore, an oxide film is most often formed on the nickel powder surface before carbon is coated or introducedthereon. Once the oxide film is formed on the surface, the film is difficult to remove completely. In particular, in the case of nickel particles of a small size, the surface activity is very high, and therefore the oxide film is even more difficult to remove. Further, the removal of a natural oxide film from the carbon-coated nickel powder obtained with the method disclosed in PTL 1 leaves depressions there.

Where an oxide film is present on the nickel powder surface, a nickel powder is produced in which the carbon coating film is formed on the oxide film. When a conductive paste is produced using such a carbon-coated nickel powder and the paste is fired, oxygen of the oxide film reacts with carbon of the carbon coating film during firing and is released as carbon dioxide. Therefore, a good fired film which is dense, free of defects, and excellent in continuity cannot be obtained. Further, in the methods disclosed in PTL 1 and PTL 2, since the carbon coating film is formed by heat treatment at a temperature lower than the decomposition temperature of the hydrocarbon compound producing the carbon film, the carbon coating film is formed including a large amount of impurities such as hydrogen and oxygen. Since the carbon coating film includes such impurities, gas is generated during firing and a good fired film cannot be obtained as in the above case. Another problem is that since the impurities are included in the carbon coating film and nickel particles themselves, a sufficient electric conductivity cannot be obtained.

The investigation conducted by the inventors revealed that the nickel particles obtained by the methods disclosed in PTL 3 and PTL 4 have a very broad particle size distribution and nickel particles with a narrow particle size distribution, which are required for the aforementioned internal conductor, cannot be obtained. This is supposedly because the metal vapor produced by melting and vaporization of a metallic raw material is difficult to cool uniformly and nickel nuclei are generated at different timings.

Further, the carbon-containing nickel powder disclosed in PTL 2 was proposed to improve a shrinkage characteristic, and although the shrinkage start temperature can be as high as 931° C. or 1007° C., since the shrinkage starts abruptly when the shrinkage start temperature is reached, the problem associated with the likelihood of occurrence of delamination or cracking between the ceramic layer and internal conductor layer during firing performed at a high temperature of 1200° C. or higher cannot be fully resolved.

PTL 5 and PTL 6 likewise disclose the inventions aimed at improving the shrinkage characteristics of nickel powder. In the inventions disclosed in PTL 5 and PTL 6, the shrinkage characteristics of nickel powder are improved by coating the nickel powder with nickel oxide or nickel hydroxide, rather than coating the nickel powder with carbon. However, in the inventions disclosed in PTL 5 and PTL 6, the shrinkage behavior at a low temperature equal to or lower than 400° C. is particularly considered, and the shrinkage behavior up to a temperature as high as 1200° C. is not considered. Therefore, the problem that delamination or cracks are easily generated is not sufficiently resolved, in the same manner as described hereinabove.

Further, in PTL 5 and PTL 6, nickel oxide or nickel hydroxide is present and the state of the coating film, or the like, on the surfaces of nickel particles is not analyzed in detail by X-ray photoelectron spectroscopy (XPS, ESCA). Therefore, the improvement in shrinkage characteristics is not sufficient and the problem that delamination or cracks are easily generated is not sufficiently resolved, in the same manner as described hereinabove.

The present invention has been made to solve the above-mentioned problems, and it is an objective of the present invention to provide a carbon-coated metal powder with few impurities and a narrow particle size distribution, the carbon-coated metal powder enabling the formation of multilayer electronic components with few defects, such as delamination and cracks, when used in a conductive paste for forming internal conductors and electrodes of multilayer electronic components. It is another objective of the present invention to provide a conductive paste containing the carbon-coated metal powder and a multilayer electronic component using the conductive paste.

Yet another objective of the present invention is to provide a method for manufacturing a carbon-coated metal powder with few impurities and a narrow particle size distribution.

Solution to Problem

The carbon-coated metal powder in accordance with the present invention comprises a metal powder and a carbon coating film that covers the metal powder, wherein when a 10% value, 50% value, and 90% value in a volume-based cumulative fraction in the particle size distribution measurements by a laser diffraction method are denoted by D10, D50, and D90, respectively, D50 is 300 nm or less, and an SD value represented by (D90-D10)/(D50) is 1.5 or less;

an oxygen content in a weight proportion of an oxygen component to the carbon-coated metal powder of a unit weight is 1500 ppm or less per specific surface area of 1 $m^2/g$ of the powder; and X represented by Expression (1) is 50 or less when a TMA (thermomechanical analysis) measurement is performed by raising a temperature from a room temperature to 1200° C. at a rate of 5° C/min in a nitrogen-hydrogen reducing atmosphere:

$$X(\%) = (X_{200°\ C.}/X_{MAX}) \times 100 \tag{1}$$

(in Expression (1), $X_{MAX}$ is a maximum shrinkage percentage and $X_{200°\ C.}$ is a maximum value in differences, each of which is a difference between a maximum shrinkage percentage and a minimum shrinkage percentage in a temperature width of 200° C.)

Further, the carbon-coated metal powder in accordance with the present invention comprises a nickel-based powder of nickel or containing nickel as a main component, and a carbon coating film that covers the nickel-based powder, wherein an oxygen content in a weight proportion of an oxygen component to the carbon-coated metal powder of a unit weight is 1500 ppm or less per specific surface area of 1 $m^2/g$ of the powder; and in a surface analysis by ESCA, a peak position attributable to 1 s of a carbon atom in a position at 11 nm from a particle surface toward a particle center is shifted to a low-energy side with respect to the peak position in a position at 1 nm from the particle surface toward the particle center. The above-mentioned shift to the low-energy side in the surface analysis by ESCA is preferably 0.08 eV or more. It is preferred that peaks attributable to nickel oxide and nickel hydroxide be not present. This carbon-coated metal powder can be also referred to as "carbon-coated nickel-based powder". It is also preferred that this carbon-coated metal powder (carbon-coated nickel-based powder) further has the above-described properties (D50, SD value, X defined by the TMA measurements) specified with respect to the carbon-coated metal powder characterized by the TMA or the like.

A method for manufacturing a carbon-coated metal powder in accordance with the present invention includes:

a metal vapor generation step for heating a metallic raw material in a reaction vessel and melting and vaporizing the metallic raw material to generate a metal vapor;

a conveying step for conveying the metal vapor by a carrier gas from the reaction vessel to a cooling tube;

a metal nuclei generation step for cooling the metal vapor inside the cooling tube and generating metal nuclei; and a metal nuclei growth step for growing the generated metal nuclei, wherein in the metal nuclei generation step, a carbon source is supplied into the cooling tube and endothermically decomposed to cool rapidly the metal vapor and cause the formation of a carbon coating film on the surfaces of the metal nuclei in parallel with the metal nuclei generation.

The carbon-coated metal powder in accordance with the present invention can be obtained by the abovementioned manufacturing method.

Advantageous Effects of Invention

The carbon-coated metal powder in accordance with the present invention is a fine powder having few impurities and a narrow particle size distribution. The powder demonstrates a suitable sintering behavior when used for a conductive paste for forming internal conductors and electrodes of multilayer electronic components and can form a very thin electrode with few cavities. Therefore, a multilayer electronic component with few defects such as delamination and cracks can be obtained using the conductive paste.

The carbon-coated metal powder in accordance with the present invention can be obtained by the above-described manufacturing method.

BRIEF DESCRIPTION OF DRAWINGS

FIG. 4 shows a TMA chart of the carbon-coated metal powders obtained in Examples 1 to 5, 8, and 11.

FIG. 5 shows a TMA chart of the carbon-coated metal powders obtained in Comparative Examples 1 and 3 to 5.

DESCRIPTION OF EMBODIMENTS

Figure 1:
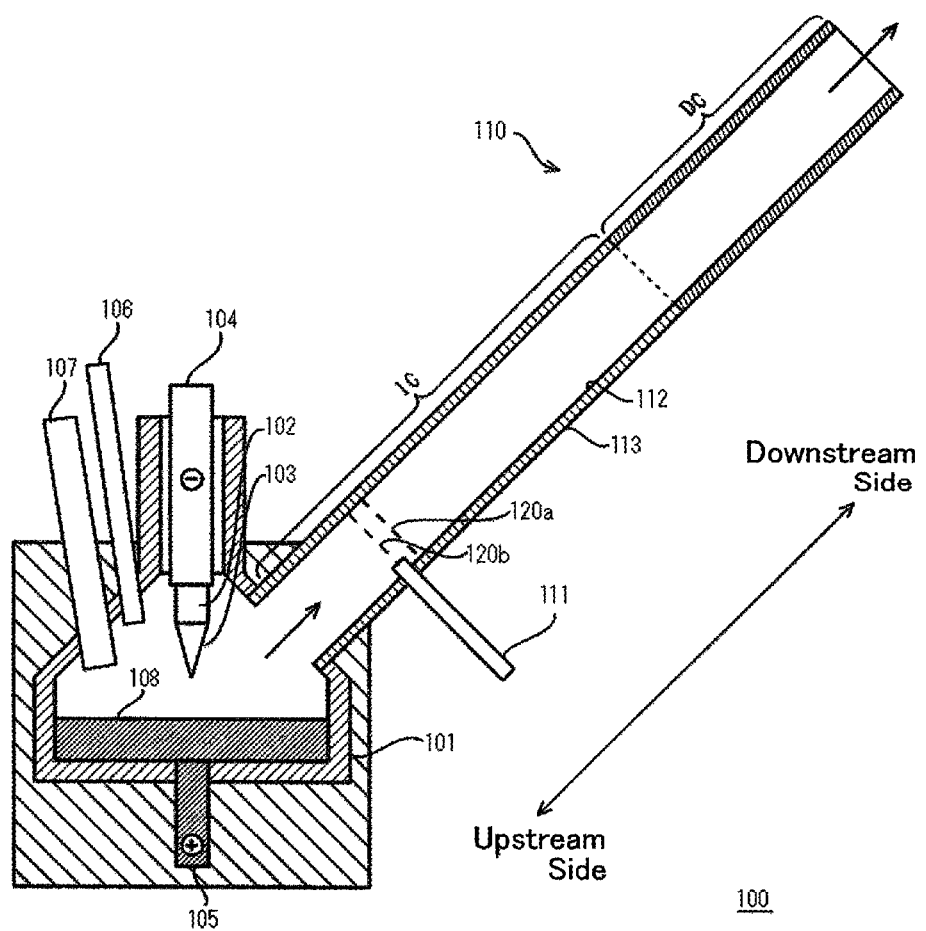
FIG. 1 is a schematic diagram illustrating an example of the structure of a plasma device for use in the method for manufacturing the carbon-coated metal powder in accordance with the present invention.

The present invention will be explained hereinbelow on the basis of specific embodiments thereof, but the present invention is not limited thereto. Numerical ranges represented by " . . . to . . . " in the description include the numerical values standing before and after the "to".

The carbon-coated metal powder in accordance with the present invention comprises a metal powder and a carbon coating film that covers the metal powder. This powder is particularly advantageous for forming internal conductors (internal electrodes) or terminal electrodes of multilayer electronic components, but this application is not limiting and the powder may be also used for other various applications.

Carbon-Coated Metal Powder

The metal of the carbon-coated metal powder is not particularly limited, but a base metal is preferred, and a metal containing at least one of nickel and copper is particularly preferred. Specific examples of particularly preferred metal powders include a nickel powder consisting essentially of nickel only, a copper powder consisting essentially of copper only, and a powder constituted by nickel and copper. "Consisting essentially of nickel only", as referred to herein, means that nickel is contained in an amount of more than 98 wt. % in the metal powder. Likewise, "consisting essentially of copper only", as referred to herein, means that copper is contained in an amount of more than 98 wt. % in the metal powder. A nickel powder containing copper in an amount of 2 wt. % to 20 wt. % is particularly preferred as the metal powder constituted by nickel and copper.

In the carbon-coated metal powder, where a 10% value, 50% value, and 90% value in a volume-based cumulative fraction in particle size distribution measurements by laser diffraction method are denoted by D10, D50, and D90, respectively, D50 is 300 nm or less, and an SD value represented by (D90-D10)/(D50) is 1.5 or less. D50 is preferably 100 nm to 300 nm, more preferably 150 nm to 300 nm. It is also desirable that the SD value be as small as possible, but in terms of production and cost, a value equal to or less than 0.5 is difficult to obtain.

The thickness of the carbon coating film can be determined from a TEM observation image, and the preferred thickness is 2 nm to 15 nm. Within this range, a sufficient sintering suppression effect can be obtained and the amount of carbon remaining after firing can be suppressed.

As for the oxygen content in the carbon-coated metal powder, the weight proportion of an oxygen component to the carbon-coated metal powder of a unit weight is 1500 ppm or less, preferably 1000 ppm or less, even more preferably 800 ppm or less, per specific surface area of 1 $m^2/g$ of the powder, and it is desirable that this oxygen content be as small as possible, but a value equal to or less than 10 ppm is difficult to obtain. The specific surface area herein is measured by a BET method. For example, "1500 ppm or less per specific surface area of 1 $m^2/g$ of the powder" means that where the specific surface area of the carbon-coated metal powder is a $m^2/g$, the oxygen content in the carbon-coated metal powder of a unit weight is equal to or less than (a×1500) ppm, that is, equal to or less than $1500 \times 10^{-6}$ g per surface area of 1 $m^2$ of the carbon-coated metal powder.

It is desirable that the content of carbon be 0.5 wt. % to 3.50 wt. % and the content of oxygen be equal to or less than 1 wt. %, and as small as possible, in the carbon-coated metal powder, the specific contents being different depending on the particle size. It is also preferred that the content of the impurities including oxygen be reduced to 3 wt. % or less. Within the above-described ranges, the amounts of carbon and impurities remaining after firing can be suppressed.

Further, in the carbon-coated metal powder, X represented by Expression (1) is 50 or less when thermomechanical analysis (TMA) measurements are performed by raising the temperature from a room temperature to 1200° C. at a rate of 5° C./min in a nitrogen-hydrogen reducing atmosphere.

$$X(\%) = (X_{200°C}/X_{MAX}) \times 100 \tag{1}$$

Here, the room temperature is about 25° C. to 30° C. In Expression (1), $X_{MAX}$ is a maximum shrinkage percentage, that is, a maximum shrinkage percentage within a range from a room temperature to 1200° C. $X_{200°C}$ is a maximum value in differences, each of which is a difference between a maximum shrinkage percentage and a minimum shrinkage percentage in a temperature width of 200° C., namely, a value determined by obtaining each difference between a maximum shrinkage percentage and a minimum shrinkage percentage in a temperature width of 200° C. over the range of from the room temperature to 1200° C. and taking the maximum value among the differences. For example, referring to FIGS. 4 and 5, the difference between the maximum shrinkage percentage and minimum shrinkage percentage in a temperature width of 200° C. in which the curve representing the thermal shrinkage percentage versus the rising temperature changes most rapidly is taken as $X_{200°C}$. Thus, the X (%) calculated from the Expression (1) is an indicator that indicates the degree to which the carbon-coated metal powder has rapidly shrunk within a range from a room temperature to 1200° C. The higher this value the more rapid the shrinking.

It is preferred that the $X_{MAX}$ be less than 19.5%. Further, when the temperature width of 200° C., giving the $X_{200°C}$ is taken as T to (T+200)° C., it is preferred that T° C.>400° C. Thus, it is preferred that the start temperature of the temperature width of 200° C. in which the difference between the maximum shrinkage percentage and minimum shrinkage percentage reaches a maximum be higher than 400° C. Further, where a maximum shrinkage percentage in a range from a room temperature to 400° C. is denoted by $X'_{MAX}$, it is preferred that X' represented by X' (%)=($X'_{MAX}$/$X_{MAX}$)×100 be 30 or less, more preferably 25 or less. As a result, defects which are caused by a mismatch in sintering behavior are unlikely to occur when the conductor layers formed from the conductive paste containing the carbon-coated metal powder are co-fired with ceramic sheets.

Carbon-Coated Metal Powder (Carbon-Coated Nickel-Based Powder)

Described hereinbelow is a carbon-coated metal powder which has a nickel-based powder and a carbon coating film on the nickel-based powder, this carbon-coated metal powder having the below-described properties determined by surface analysis by ESCA. To facilitate the explanation herein, the carbon-coated metal power is described as a "carbon-coated nickel-based powder".

The "nickel-based powder" is a nickel-based powder consisting essentially of nickel only or containing nickel as the main component. "Consisting essentially of nickel only", as referred to herein, means that nickel is contained in an amount of higher than 98 wt. % in the metal powder. Further, "containing nickel as the main component" means that nickel is contained in an amount of higher than 50 wt. % in the metal powder. A nickel powder containing copper, in particular, a nickel powder containing copper in an amount of 2 wt. % to 20 wt. % is preferred as the nickel-based powder containing nickel as the main component.

In the carbon-coated nickel-based powder, the oxygen content in the weight proportion of an oxygen component to the carbon-coated metal powder of a unit weight is 1500 ppm or less, preferably 1000 ppm or less, even more preferably 800 ppm or less, per specific surface area of 1 m$^2$/g of the powder, and it is desirable that the oxygen content be as small as possible, but a value equal to or less than 10 ppm is difficult to obtain. The contents of carbon and impurities including oxygen are the same as in the above-described carbon-coated metal powder.

In the carbon-coated nickel-based powder, the position of a peak attributable to 1 s of a carbon atom changes from the particle surface toward the particle center in surface analysis by ESCA. A peak position attributable to 1 s of a carbon atom in a position at 11 nm from the particle surface toward the particle center is shifted to a low-energy side with respect to the peak position in a position at 1 nm from the particle surface toward the particle center. This shift to the low-energy side is preferably 0.08 eV or more, and a carbon-coated nickel-based powder in which the amount of the shift is 1.00 eV or less is easy to obtain. The peak attributable to 1 s of a carbon atom is specifically a peak present in the vicinity of a binding energy of about 284.6 eV. The reason for such shifting is considered hereinbelow.

The position at 1 nm from the particle surface toward the particle center is in the vicinity of the carbon coating film surface and a large amount of carbon is present therein. The position at 11 nm from the particle surface toward the center is in the vicinity of the interface of the carbon coating film and the nickel-based powder, and a nickel carbide layer formed by carbon and nickel is present therein. Thus, electron states differ between the positions at 1 nm and 11 nm from the particle surface toward the center, and therefore a shift occurs.

As a result of a continuous change from nickel to the carbon layer due to such a nickel carbide layer, a strong carbon coating film with a high adhesive strength can be formed.

In the carbon-coated nickel-based powder in accordance with the present invention, it is preferred that peaks attributable to nickel oxide and nickel hydroxide be not present in the particle surface, as determined by surface analysis by ESCA. The peak attributable to nickel oxide is specifically a peak present in the vicinity of a binding energy of about 854.0 eV. The peak attributable to nickel hydroxide is specifically a peak present in the vicinity of a binding energy of about 855.7 eV.

Since nickel oxide and nickel hydroxide thus hardly exist in the particle surface, the content of oxygen in the carbon-coated nickel-based powder in accordance with the present invention can be greatly reduced.

With the carbon-coated nickel-based powder having such features, it is possible to obtain a carbon-coated nickel-based powder having very few impurities. It is also preferred that in addition to the above-described properties and features, the carbon-coated nickel-based powder have the same properties (TMA properties, etc.) as those of the aforementioned carbon-coated metal powder specified by TMA properties and also the properties, such as the thickness of the carbon coating film, which are described as being preferred for the aforementioned carbon-coated metal powder specified by TMA properties. As a result, additional effects can be obtained.

Method for Manufacturing Carbon-Coated Metal Powder

A method for manufacturing a carbon-coated metal powder in accordance with the present invention includes: a metal vapor generation step for heating a metallic raw material in a reaction vessel and melting and vaporizing the metallic raw material to generate a metal vapor; a conveying step for conveying the metal vapor with a carrier gas from the reaction vessel to a cooling tube; a metal nuclei generation step for cooling the metal vapor inside the cooling tube and generating metal nuclei; and a metal nuclei growth step for growing the generated metal nuclei. In this method in the metal nuclei generation step, a carbon source is supplied into the cooling tube and endothermically decomposed to cool rapidly the metal vapor and cause the formation of a carbon coating film on the surfaces of the metal nuclei in parallel with the metal nuclei generation. With this manufacturing method, it is possible to obtain the carbon-coated metal powder in accordance with the present invention.

The method for manufacturing a carbon-coated metal powder in accordance with the present invention will be explained hereinbelow in greater detail with reference to the appended drawings.

Initially, a plasma device to be used in the method for manufacturing a carbon-coated metal powder in accordance with the present invention will be explained with reference to FIG. 1. FIG. 1 is a schematic diagram illustrating an example of the configuration of a plasma device 100 to be used in the method for manufacturing a carbon-coated metal powder in accordance with the present invention.

A metallic raw material is accommodated inside a reaction vessel 101. A feed port 107 serves to supply the metallic raw material into the reaction vessel 101. A predetermined amount of the metallic raw material is prepared inside the reaction vessel 101 before the operation of the device is started, and after the operation of the device has been started, the metallic raw material is supplied from the feed port 107 into the reaction vessel 101 as required in accordance with the amount of the metallic raw material discharged as a metal vapor from the inside of the reaction vessel 101. Therefore, the plasma device 100 in accordance with the present invention is suitable for long-term continuous manufacture of the carbon-coated metal powder.

A plasma torch 102 is disposed above the reaction vessel 101, and a plasma generating gas is supplied to the plasma torch 102 through a supply tube (not depicted in the figure). The plasma torch 102 generates plasma 103 between a cathode 104 and an anode (not depicted in the figure) which is provided inside the plasma torch 102, and then generates plasma 103 between the cathode 104 and an anode 105, at least part of the metallic raw material located inside the reaction vessel 101 is melted by the heat of the plasma 103, and a metal melt 108 is generated. The plasma torch 102 also vaporizes part of the melt 108 with the heat of the plasma 103, thereby generating a metal vapor.

A carrier gas supply unit 106 supplies a carrier gas, which serves for conveying the metal vapor, into the reaction vessel 101.

A cooling tube 110 is connected to the reaction vessel 101. The metal vapor generated inside the reaction vessel 101 is conveyed by the carrier gas into the cooling tube 110.

The cooling tube 110 is provided with an indirect cooling zone IC for indirectly cooling the metal vapor and a direct cooling zone DC for directly cooling the carbon-coated metal powder, in the order of description from the reaction vessel 101 side (upstream side). The indirect cooling zone IC is constituted by two tubes, namely, an inner tube 112 and an outer tube 113. A cooling fluid is circulated in a space between the outer wall of the inner tube 112 and the inner wall of the outer tube 113, and the periphery of the cooling tube 110 (inner tube 112) is cooled or heated. As a result, the temperature of the indirect cooling zone IC is controlled. Further, inside the indirect cooling zone IC, the indirect cooling is performed with respect to the metal vapor from the reaction vessel 101, and also the carbon-coated metal powder generated by the formation of a carbon coating film on the metal nuclei surfaces in parallel with the generation of metal nuclei from the metal vapor. The carbon source to be supplied for forming the carbon coating film is described hereinbelow.

The aforementioned carrier gas or other gas can be used as the cooling fluid. Liquids such as water, warm water, methanol, ethanol, or mixtures thereof can also be used. From the standpoint of cooling efficiency and cost, water or warm water is preferably used as the cooling fluid. Using a cooling fluid is explained herein as an example of the method for cooling or heating the periphery of the cooling tube 110 (inner tube 112), but the cooling or heating method is not limited to this. For example, an external heater may be provided on the periphery of the cooling tube 110 for cooling or heating.

In the direct cooling zone DC, direct cooling is performed by spraying or mixing a cooling fluid supplied from a cooling fluid supply unit (not depicted in the figure) to the carbon-coated metal powder which has been conveyed from the indirect cooling zone IC. The cooling fluid used in the direct cooling zone DC may be the same as or different from the cooling fluid used in the indirect cooling zone IC, but from the standpoint of handleability and cost, it is preferred that a gas the same as the above-mentioned carrier gas be used. When the cooling fluid includes a liquid, the liquid is introduced into the cooling tube 110 (inner tube 112) in a sprayed state.

In the direct cooling zone DC, a cooling tube may be used which has a cross-sectional area of the opening larger than that in the indirect cooling zone IC. As a result, the carrier gas that has passed through the indirect cooling zone IC can be rapidly expanded and the cooling efficiency can be increased.

In the drawings of the present specification, the specific cooling mechanism of the indirect cooling zone IC and direct cooling zone DC are omitted, but a well-known mechanism (for example, the mechanism described in Japanese Translation of PCT International Application Publication No. 2002-530521) can be used, provided that the operational effect of the present invention is not impeded.

Further, protrusions or recesses may be provided in the inner wall of the inner tube 112 of the cooling tube 110 on the upstream side from the below-described virtual plane 120b. As a result, the flow of the mixed gas of the carrier gas and metal vapor inside the cooling tube 110 is disturbed and agitated. As a result, unevenness of the temperature and flow velocity of the carrier gas and the metal vapor concentration can be suppressed, thereby better matching the timings of the generation of nuclei.

The carbon source supply unit 111 is connected to the opening, which is provided locally in the inner wall of the inner tube 112, and provided such that the carbon source which is a source material for carbon coating in the carbon-coated metal powder can be supplied into the indirect cooling zone IC. The term "locally" used herein refers to a portion in the vicinity of the virtual plane 120a which is preferably a transverse sectional zone with a width of 10 cm or less, more preferably a transverse sectional zone with a width of 5 cm or less in the longitudinal direction of the cooling tube 110. In order to supply the carbon source into the indirect cooling zone IC, it is preferred, for example, that the size of the opening in the inner wall of the inner tube 112 to which the carbon source supply unit 111 is connected be 10 cm or less. In FIG. 1, only one opening is provided, but a plurality of openings may be provided and a carbon source may be supplied from a plurality of locations, provided that they are in the vicinity of the virtual plane 120a. For example, one more opening may be provided opposite the opening depicted in FIG. 1, and the carbon source may be supplied from the two openings.

As mentioned hereinabove, the carbon source supply unit 111 is preferably provided such as to enable the supply of the carbon source in the vicinity of the virtual plane 120a, more preferably provided such as to enable the supply of the carbon source to the upstream side from the virtual plane 120a in the vicinity of the virtual plane 120a. The virtual plane 120a, as referred to herein, which is described hereinbelow in greater detail, is the position where a large number of metal nuclei are generated inside the indirect cooling zone IC when the carbon source supply unit 111 is not provided, that is, when the carbon source is not supplied to the indirect cooling zone IC. This virtual plane can be determined, for example, by simulating the temperature distribution inside the cooling tube 110 or analyzing the matter that has adhered inside the cooling tube 110 of an actual device.

A collector (not depicted in the figure) is provided on the downstream side from the cooling tube 110. The carbon-coated metal powder which has been conveyed further downstream from the cooling tube 110 is separated from the carrier gas and collected by the collector. The carrier gas separated in the collector may be reused in the carrier gas supply unit 106.

Figure 2:
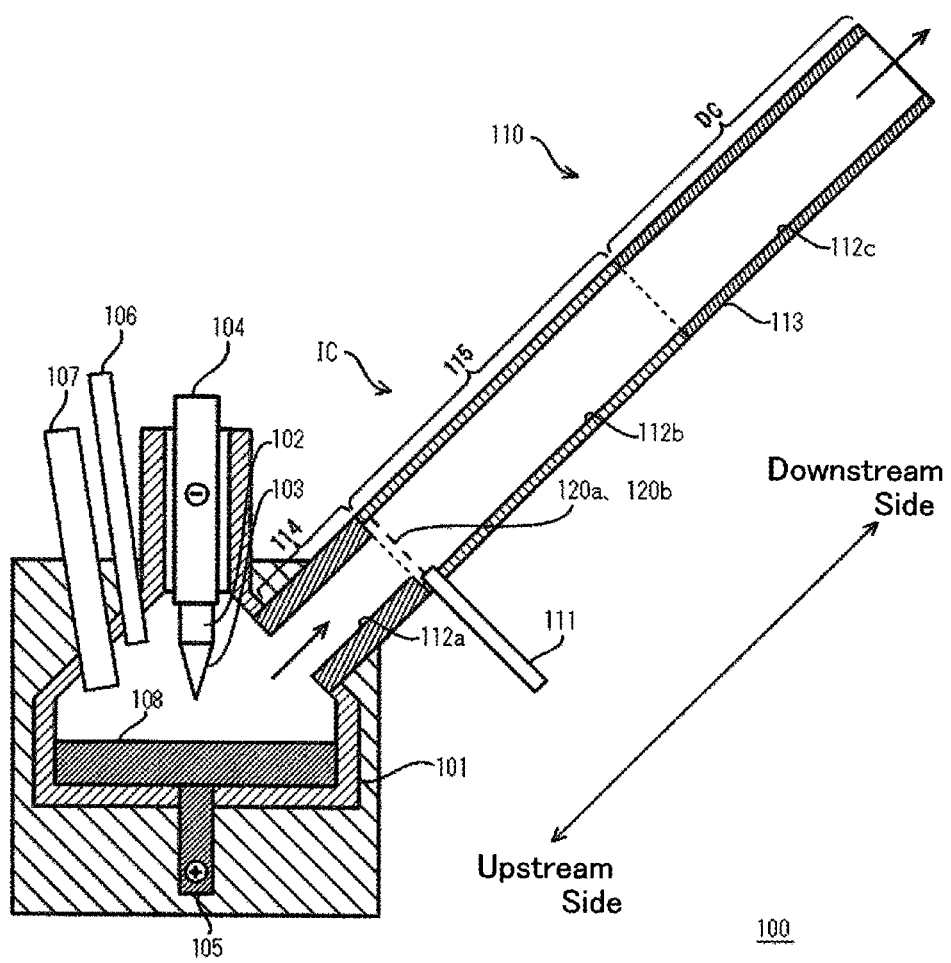
FIG. 2 is a schematic diagram illustrating another example of the structure of a plasma device for use in the method for manufacturing the carbon-coated metal powder in accordance with the present invention.

The plasma device 100 having a different configuration will be explained hereinbelow with reference to FIG. 2. FIG. 2 is a schematic diagram illustrating another example of the configuration of the plasma device 100 which is used in the method for manufacturing the carbon-coated metal powder in accordance with the present invention. Only the parts different from those of the plasma device 100 depicted in FIG. 1 are explained herein.

The indirect cooling zone IC is provided with a first indirect cooling zone 114 into which the metal vapor is conveyed from the reaction vessel 101 and a second indirect cooling zone 115 which is disposed between the first indirect cooling zone 114 and the direct cooling zone DC. The cross-sectional area of the opening of the first indirect cooling zone 114 is less than the cross-sectional area of the opening of the second indirect cooling zone 115. The opening, as referred to herein, is a portion serving as a flow channel in which the metal vapor is conveyed. In FIG. 2, the opening is a portion surrounded by the inner walls of the inner tubes 112a, 112b. The cross-sectional area, as referred to herein, is the area of the opening in a plane perpendicular to the longitudinal direction of the cooling tube. It is preferred that the first indirect cooling zone 114 and the second indirect cooling zone 115 each have a cylindrical shape and the inner diameter of the first indirect cooling zone 114 be less than the inner diameter of the second indirect cooling zone 115.

The carbon source supply unit 111 is preferably provided such as to enable the supply of the carbon source into the second indirect cooling zone 115, more preferably such as to enable the supply of the carbon source into the second indirect cooling zone 115 in the vicinity of the first indirect cooling zone 114. In this case, the supply portion of the carbon is at a portion where the volume of the carrier gas rapidly increases and the concentration of the metal vapor rapidly decreases after or immediately after the metal vapor has been conveyed from the first indirect cooling zone 114 with a small cross-sectional area into the second indirect cooling zone 115 with a large cross-sectional area. In the description hereinabove, the indirect cooling zone IC is configured of two zones of different cross-sectional areas, but it may be also configured of three or more zones of different cross-sectional areas.

The method for manufacturing the carbon-coated metal powder in accordance with the present invention will be explained hereinbelow in greater detail with reference to FIGS. 1 and 2. Described herein is the method for manufacturing the carbon-coated metal powder which uses the above-described plasma device 100, but the carbon-coated metal powder may be also manufactured using a manufacturing device having another configuration.

Metal Vapor Generation Step to Conveying Step

Initially, the metallic raw material is introduced into the reaction vessel 101. The metallic raw material is not particularly limited, provided that it is an electrically conductive substance containing metal components of the target carbon-coated metal powder. Pure metals and also alloys, composites, mixtures, compounds, etc., containing two or more metal components can be used. Examples of suitable metal components include silver, gold, cadmium, cobalt, copper, iron, nickel, palladium, platinum, rhodium, ruthenium, tantalum, titanium, tungsten, zirconium, molybdenum, niobium, etc. The metallic raw material preferably has a boiling point higher than the decomposition temperature of the carbon source, more preferably 700° C. to 3600° C. As a result, an atmosphere with a temperature equal to or higher than the decomposition temperature of the carbon source can be easily obtained inside the cooling tube 110. Where the boiling point is higher than 3600° C., the carbon coating film is difficult to control.

The metallic raw material is not particularly limited, but base metals which are more easily oxidized than noble metals are preferred because the effect of the present invention is better demonstrated. A metallic raw material containing at least either one of nickel and copper is particularly preferred. It is particularly preferred that the metallic raw material consists essentially of nickel (boiling point 2732° C.) only, essentially of copper (boiling point 2567° C.) only, or a mixture, alloy, or composite of nickel and copper. "Consists essentially of nickel only", as referred to herein, means that nickel is contained in an amount of more than 98 wt. % in the metallic raw material. Likewise, "consists essentially of copper only", as referred to herein, means that copper is contained in an amount of more than 98 wt. % in the metallic raw material. A nickel metallic raw material containing copper in an amount of 2 wt. % to 20 wt. % is particularly preferred as the metallic raw material containing nickel and copper. From the standpoint of handleability, it is preferred that a metal material, alloy, or composite material in the form of grains or lumps with a size of about several millimeters to several tens of millimeters be used as the metallic raw material, but such dimensions are not limiting.

The metallic raw material is heated and the metallic raw material is melted and vaporized to generate a metal vapor. More specifically, the plasma 103 is generated between the cathode 104 and the anode 105, at least part of the metallic raw material contained inside the reaction vessel 101 is melted by the heat of the plasma 103, and the melt 108 of the metallic raw material is generated. Part of the melt 108 is vaporized by the heat of the plasma 103 and the metal vapor is generated. It is preferred that the metal vapor generation step be implemented in a state in which the carbon source is not present. Thus, it is preferred that the carbon source be not present inside the reaction vessel 101. This is because when the carbon source is present in the reaction vessel 101, the carbon source is converted to plasma and the coated amount of carbon is difficult to control. Further, heating by plasma is the preferred method for heating the metallic raw material, but this method is not limiting, provided that the metallic raw material can be melted and vaporized.

The metal vapor generated inside the reaction vessel 101 is conveyed by the carrier gas into the cooling tube 110. It is preferred that an inert gas be used as the carrier gas. In the description hereinbelow, nitrogen gas is used as the carrier gas, unless specifically stated otherwise. If necessary, a reducing gas such as hydrogen, carbon monoxide, methane, ammonia gas or the like or organic compounds such as alcohols, carboxylic acids or the like may be mixed with the carrier gas. In addition, components such as phosphorus, sulfur or the like may be introduced to improve and adjust the state and properties of the carbon-coated metal powder. The plasma generating gas which has been used for plasma generation also functions as part of the carrier gas. As mentioned hereinabove, it is preferred that the carbon source be not present inside the reaction vessel 101, and it is preferred that gas not containing any component that can become a carbon source, such as methane, be used as the carrier gas.

The flow rate of the carrier gas is preferably controlled such that the metal concentration becomes 0.01 g/L to 1 g/L. As a result, the metal vapor can be efficiently and rapidly cooled by endothermic decomposition of the carbon source.

Metal Nuclei Generation Step

The metal vapor conveyed from the reaction vessel 101 is cooled inside the cooling tube 110, and metal nuclei are generated from the metal vapor. The specific feature of the present invention is that the carbon source supplied by the carbon source supply unit 111 into the cooling tube 110 is endothermically decomposed and rapidly cools the metal vapor, thereby forming a carbon coating film on the surfaces of the metal nuclei in parallel with the generation of the metal nuclei.

The carbon source endothermically reacts during the decomposition (endothermically decomposes). The decomposition temperature of the carbon source is preferably 700° C. to 3600° C. If 3600° C. is exceeded, graphite contained in the carbon coating film formed on the metal surface easily sublimates and the carbon coating film is difficult to control.

Hydrocarbons such as ethane, methane, propane, butane, ethylene, propylene, butylene, etc., and alcohols such as ethanol, monoethylene glycol, etc. can be used as the carbon source. The carbon source can be also used in a solid, liquid, or gaseous form, but using a gaseous carbon source is preferred. By using the gaseous carbon source, it is possible to decompose the carbon source to carbon elements. More specifically, it is preferred that methane gas (decomposition temperature about 700° C.) be used as the carbon source. It is also preferred that the decomposition temperature of the carbon source be lower than the boiling temperature of the metallic raw material preferably by 100° C. or more, more preferably by 500° C. or more, even more preferably by 1000° C. or more, and it is preferred that nickel or a metallic raw material containing nickel as the main component be used as the metallic raw material and methane gas be used as the carbon source. As a result, the carbon source is efficiently decomposed at a temperature reached inside the cooling tube 110 where the metal vapor is conveyed. Where a mixed gas is supplied in which the carbon source is introduced in a carrier gas such as argon gas, this mixed gas is also referred to as "carbon source".

Since the carbon source is endothermically decomposed, the metal vapor can be cooled and metal nuclei can be generated with even a small amount of carbon source. Where the flow rate per minute is denoted by V (L) and the cross-sectional area in the supply location of the carbon source is denoted by S (cm$^2$), the carbon source is supplied such that V/S (L/cm$^2$) is greater than 0 and preferably 10 or less, more preferably 5 or less, even more preferably 3 or less. The temperature of the supplied carbon source is not particularly limited, provided that it is less than the decomposition temperature of the carbon source, and it is not necessary to heat the carbon source in advance, and the carbon source, for example, at room temperature (25° C. to 30° C.) can be used. The amount of the carbon source added is preferably such as to obtain the carbon content at 0.1 wt. % to 5 wt. % with respect to the amount of metal in the generated carbon-coated metal powder. For example, it is preferred that the flow rate of the carbon source be 7 L to 25 L per minute when nickel is used as the metallic raw material, a mixed gas in which 10% methane is included in an inert gas such as argon gas is used as the carbon source, and the metal vapor concentration is 0.05 g/L.

The metal nuclei generation step is preferably performed in the indirect cooling step in which the above-mentioned metal vapor is indirectly cooled. The indirect cooling step can be performed in the indirect cooling zone IC of the cooling tube 110. In this step, the cooling fluid is neither sprayed into nor mixed with the metal vapor. Therefore, the carbon source is easily supplied to the metal vapor present at a specific position. Further, in the indirect cooling zone IC, the metal vapor in the carrier gas which is conveyed to inside the cooling tube 110 in a high-temperature state is cooled by radiation cooling, and the formation of the metal-coated carbon powder with a uniform particle size in the carrier gas is facilitated by advancing the growth and crystallization of metal nuclei generated in the atmosphere with a temperature that is stably and uniformly controlled. Because of such stable and uniform temperature control, the temperature of the metal vapor can be rapidly changed by the endothermic decomposition of the carbon source.

More specifically, the metal vapor is conveyed from the reaction vessel 101 to the indirect cooling zone IC of the cooling tube 110. At a point of time at which the metal vapor in the carrier gas is introduced from the reaction vessel 101 into the indirect cooling zone IC, the concentration of the metal vapor in the carrier gas is high and the temperature is several thousand K (for example, 5000 K), but the indirect cooling (radiation cooling) reduces the temperature close to the boiling point of the metal. Usually, where the metal vapor temperature becomes equal to or less than the boiling point, the metal vapor forms droplets and the generation of metal nuclei is started. Incidentally, a large number of nuclei start to be generated almost at the same time at a certain position (in the present invention, called the virtual plane) inside the indirect cooling zone IC. The virtual plane changes according to the types of the target metal and carbon source, concentrations of the metal vapor and carbon source, flow rate of the carbon source and carrier gas, temperatures of the metal vapor, carrier gas, and carbon source, and temperature distribution inside the cooling tube, etc. and does not indicate a specific position. However, in order to facilitate the understanding, the virtual plane in the case the carbon source is not supplied is set herein as 120a and the virtual plane in the case the carbon source is supplied is set herein as 120b.

In the present invention, the carbon source is supplied from the carbon source supply unit 111 to the metal vapor which has been cooled to the vicinity of the boiling point. More specifically, it is preferred that the carbon source be supplied to a position (for example, the virtual plane 120b) with a temperature equal to or higher than the decomposition temperature of the carbon source and equal to or less than {(the boiling point of the metallic raw material)+[(the boiling point)×10%]}° C. For example, it is preferred that the carbon source be supplied to a position with a temperature equal to or higher than about 700° C., which is the decomposition temperature of methane, and equal to or less than 3005° C. [2732° C. (boiling point of nickel)+(2732° C.×10%)].

In the plasma device 100 depicted in FIG. 1, the carbon source is supplied to the upstream side in the vicinity of the virtual plane 120a. This carbon source is heated to a temperature equal to or higher than the decomposition temperature, takes in the heat from the metal vapor by the endothermic reaction proceeding when the carbon source is decomposed, and rapidly cools the metal vapor. Since the temperature rapidly decreases from the temperature around the boiling point, the metal vapor does not form droplets and becomes an unstable state (oversaturated state) even at a temperature equal to or lower than the boiling point. As a result of passing through such an oversaturated state, the generation of metal nuclei starts immediately. As a consequence, the generation timings of metal nuclei are matched and the amount of metal nuclei is increased. Further, the carbon-coated metal powder with a small particle size and narrow particle size distribution is obtained. The virtual plane 120b is usually in the vicinity of the position where the carbon source is supplied from the carbon source supply unit 111, and in the plasma device depicted in FIG. 1, the upstream side in the vicinity of the virtual plane 120a becomes the virtual plane 120b.

It is even more preferred that the indirect cooling step include a first indirect cooling step and a second indirect cooling step in which indirect cooling is performed in a state in which the concentration of the metal vapor attained in the first indirect cooling step has been reduced. It is further preferred that in the second indirect cooling step, the metal vapor be rapidly cooled by endothermic decomposition of the carbon source and that the formation of the carbon coating film on the surfaces of metal nuclei be performed in parallel with the generation of metal nuclei. Further, since the volume of the metal vapor rapidly increases during the transition from the first indirect cooling step to the second indirect cooling step, the effect of rapid cooling of the metal vapor can be further increased by additional cooling caused by such volume expansion. Thus, a state with a high degree of oversaturation of the metal vapor concentration can be easily obtained by rapidly cooling the metal vapor with the carbon source simultaneously with such additional rapid cooling. A higher degree of oversaturation is preferred and, in the case of transition metals such as nickel, copper, silver, etc., a state with a high degree of oversaturation is established by bringing the metal vapor temperature close to their melting point by rapid cooling.

In this case it is further preferred that the carbon source be supplied to a position with a temperature equal to or higher than the decomposition temperature of the carbon source and equal to or less than [(melting point of metallic raw material) +(melting point×25%)]° C. For example, when the carbon source is methane, it is further preferred that the carbon source be supplied to a position with a temperature equal to or higher than about 700° C., which is the decomposition temperature of methane, to a temperature equal to or lower than 1816° C. [(1453° C., which is the melting point of nickel)+(1453° C.×25%)].

The first indirect cooling step and second indirect cooling step can be realized using the plasma device depicted in FIG. 2. Initially, indirect cooling is performed in a state with a high concentration of metal vapor in the first indirect cooling zone 114 and then indirect cooling is continuously performed in a state with a reduced concentration of metal vapor in the second indirect cooling zone 115. The carbon source is supplied by the carbon source supply unit 111 in the second indirect cooling zone 115, preferably in the second indirect cooling zone 115 in the vicinity of the first indirect cooling zone 114. In this case, the virtual planes 120a and 120b are almost at the same position, for example, at a position in the second indirect cooling zone 115 in the vicinity of the first indirect cooling zone 114.

The carbon source decomposition product (carbon) is present around the metal vapor immediately before the metal nuclei are generated and around the metal nuclei immediately after the generation thereof. Therefore, the formation of carbon coating film on the surfaces of the metal nuclei is started almost simultaneously with the generation of the metal nuclei or somewhat later, but still immediately after the generation of the metal nuclei. Further, since the coating is formed by the carbon formed by thermal decomposition, rather than carbon converted into plasma, a carbon-coated metal powder can be obtained in which a substantially uniform carbon coating film is formed.

Nuclei Growth Step to Collection Step

As mentioned hereinabove, the generated metal nuclei are continuously subjected to grain growth and crystallization in the indirect cooling zone IC. The grain growth generally involves the grain growth advancing as a result of the deposition of the metal vapor surrounding the nuclei on the nuclei surfaces and the grain growth advancing as a result of coalescence of a plurality of adjacent nuclei, and the latter mechanism is apparently predominant in terms of the effect produced on the width of the particle size distribution. In the present invention, the carbon coating film is formed on the surfaces of metal nuclei substantially simultaneously with the generation of the metal nuclei or somewhat later, but still immediately after the generation of the metal nuclei. Therefore the grain growth by coalescence is suppressed. As a result, it is possible to obtain a carbon-coated metal powder with a uniform particle size and a very narrow particle size distribution.

The carbon-coated metal powder generated by indirect cooling in the indirect cooling zone IC is then directly cooled in the direct cooling zone DC. The carbon-coated metal powder which has been directly cooled in the direct cooling zone DC is conveyed further downstream from the cooling tube 110 and separated from the carrier gas and collected in the collector.

Heat Treatment Step

The collected carbon-coated metal powder is preferably subjected to heat treatment. As a result, the degree of crystallinity of the graphite in the carbon coating is increased and the sintering suppression effect is enhanced. The degree of crystallinity of the graphite can be evaluated by a peak intensity derived from the G band of graphite in Raman spectroscopy measurement. It is preferred that the half-value width of the G band peak be 100 or less. Where it is above 100, the carbon coating is in a state in which a large amount of an amorphous component remains and the degree of crystallinity is insufficient.

The heat treatment is implemented, for example, for one hour to 10 hours at 180° C. to 1000° C. under an inert atmosphere, or for one hour to 10 hours at 180° C. to 400° C. under an air atmosphere. The preferred heat treatment temperature is 180° C. to 300° C. Where the heat treatment temperature is above 300° C., thermal aggregation occurs and dispersivity is degraded. Where the heat treatment temperature is lower than 180° C., the degree of crystallinity of graphite decreases and the effect produced by the heat treatment is reduced.

The carbon-coated metal powder obtained by the method for manufacturing a carbon-coated metal powder in accordance with the present invention has a small particle size and a narrow particle size distribution. Further, since the carbon coating film is not formed after the metal powder has been formed, as in the conventional methods, and the formation of the carbon coating film advances simultaneously with the formation of the metal powder, the amount of impurities in the obtained carbon-coated metal powder can be reduced. The impurities, as referred to herein, are components that are unavoidably admixed from the starting materials, in the manufacturing step, etc., rather than components that are introduced intentionally. Usually, the impurities are chlorine, alkali metals, etc. Therefore, where components such as phosphorus, sulfur, etc. are introduced, for example, into the carrier gas, for improving and adjusting the state and properties of the carbon-coated metal powder, those components are not referred to as impurities. The content of impurities is preferably 3 wt. % or less, the specific value depending on the particle size. With the manufacturing method in accordance with the present invention, the carbon-coated metal powder in accordance with the present invention which has a good carbon coating film can be easily obtained.

Conductive Paste and Multilayer Electronic Component Using the Same

The conductive paste in accordance with the present invention includes the above-described carbon-coated metal powder as an electrically conductive powder, the powder being kneaded with a vehicle constituted by a solvent and a binder resin. The conductive paste can be particularly advantageously used for forming internal conductors (internal electrodes) of multilayer electronic components such as multilayer capacitors, multilayer inductors, multilayer actuators, etc. but can be also used for forming terminal electrodes of ceramic electronic components and thick-film conductor circuits. The carbon-coated metal powder may be the carbon-coated metal powder characterized by TMA properties, etc. or the carbon-coated nickel-based powder characterized by ESCA analysis.

An example of a method for manufacturing the conductive paste and a multilayer electronic component will be described hereinbelow.

Initially, the carbon-coated metal powder in accordance with the present invention, a binder resin, and a solvent are kneaded using a three-roll mill. As the binder resin, cellulose resins such as ethyl cellulose, hydroxyethyl cellulose, etc., acrylic resins, methacrylic resins, butyral resins, epoxy resins, phenolic resins, rosin and so forth can be mentioned and the binder resin usually can be mixed in about 1 part by weight to 15 parts by weight per 100 parts by weight of the conductive power. As the solvent, organic solvents such as alcohols such as dihydroterpineol, etc., ketones, ethers, esters, hydrocarbons, etc., and water, or mixed solvents thereof can be selected for use as appropriate. The solvent is mixed in an appropriate amount correspondingly to the properties of the conductive powder, type of resin, applying method, and so forth. Usually, the amount of solvent is about 40 parts by weight to 150 parts by weight per 100 parts by weight of the conductive powder.

In addition to the above-mentioned components, the conductive paste of the present invention may suitably contain other commonly blended components in accordance with the intended use, examples of which include a ceramic that is the same as the ceramic contained in the ceramic sheet or that has a similar composition thereto, as well as glass, alumina, silica, copper oxide, manganese oxide, titanium oxide and other metal oxides, montmorillonite and other inorganic powders, organometallic compounds, a plasticizer, a dispersant, a surfactant, etc.

The conductive paste is manufactured in the above-described manner.

Then, the electrically conductive paste is printed in predetermined patterns on unfired ceramic green sheets serving as unfired ceramic layers, the solvent is removed by drying, and internal conductor paste layers are formed. A plurality of the obtained unfired ceramic green sheets having the internal conductor paste layer are stacked and bonded together under pressure to obtain an unfired multilayer body in which the unfired ceramic green sheets and internal conductor paste layers are stacked alternately.

The multilayer body is cut to a predetermined shape and then subjected to a binder removal step to burn out and dissipate the binder resin. The internal conductor layers are then formed simultaneously with sintering of the ceramic layers by firing the multilayer body at a high temperature of about 1200° C. to 1400° C., and a ceramic element body is obtained. A multilayer electronic component is then obtained by printing terminal electrodes onto both end surfaces of the element body. The terminal electrodes may be formed by coating a conductive paste for end terminals onto both end surfaces of the above-mentioned unfired multilayer body which has been cut to the predetermined shape, and then firing the paste simultaneously with the multilayer body.

By using the carbon-coated metal powder containing few impurities, it is possible to prevent the generation of gases during firing and obtain good fired film (internal conductor layer). Further, since the carbon-coated metal powder has a good carbon coating film, the dispersion of the powder in the conductive paste is enhanced and shrinkage properties during sintering are improved thereby bringing the sintering shrinkage behaviors of the conductor layers and ceramic layers close to each other and suppressing the occurrence of cracks and delamination.

Further, since the carbon-coated metal powder in accordance with the present invention has a narrow particle size distribution and a small average particle size, even when the fired film formed by coating and firing the conductive paste containing the carbon-coated metal powder has a small thickness, the film has few holes (defects) and excels in smoothness, denseness, and continuity, and the internal conductor layers can be reduced in thickness. The thickness of the internal conductor layers is, for example, 0.4 μm to 0.8 μm.

It follows from the above, that when the conductive paste containing the carbon-coated metal powder in accordance with the present invention is used for manufacturing a multilayer electronic component, a multilayer electronic component provided with thin internal conductor layers, which excels in denseness and continuity, and having excellent properties can be obtained without generating structural defects such as cracks, delamination, etc.

EXAMPLES

The present invention will be specifically described hereinbelow on the basis of examples thereof, but the present invention is not limited to those examples.

Example 1

A carbon-coated metal powder was manufactured using the plasma device 100 depicted in FIG. 2. A tube having a combination of an inner tube 112a (first indirect cooling zone 114) with an inner diameter of 3.8 cm, an inner tube 112b (second indirect cooling zone 115) with an inner diameter of 8 cm, and an inner tube 112c (direct cooling zone DC) with an inner diameter of 15 cm was used as the cooling tube 110. The length of the inner tube 112a was 20 cm, the length of the inner tube 112b was 22.5 cm, and the length of the inner tube 112c was 20 cm. A carbon source was supplied from a carbon source supply unit 111 having an inner diameter (supply port) of 0.32 cm at a position spaced apart by 5 cm from the upstream end of the second indirect cooling zone 115 in the downstream direction. The plasma device having the above-described configuration is referred to as plasma device A.

Nickel was used as the metallic raw material, and the vaporization rate was 10 g per minute. Nitrogen gas was used as the carrier gas. The flow rate of the carrier gas passing through the cooling tube was 200 L per minute, and the metal concentration was controlled to 0.05 g/L. A mixed gas (referred to hereinbelow as 10% methane gas) containing 10% methane in an argon gas (carrier gas) was used as the carbon source, the supply rate was 25 L per minute, and the temperature of the supplied carbon source was room temperature (25° C. to 30° C.)

In a state in which the carbon source was supplied and the metal vapor was conveyed, the temperature $T_\beta$ at a position (usually, in the vicinity of the virtual plane 120a) at which the carbon source was supplied was 1040° C. Further, in a state in which the metal vapor was conveyed without supplying the carbon source, the temperature at this position was the temperature $T_\alpha$ of 1100° C.

Unless otherwise specified, in the examples below, the temperature at the position (usually, in the vicinity of the virtual plane 120a) where a carbon source (in Comparative Examples 1 and 2, a nitrogen gas was used instead of the 10% methane gas) was supplied to the cooling tube in a state in which the metal vapor is conveyed was taken as $T_\beta$, and the temperature at the same position as the $T_\beta$ measurement position in a state in which the metal vapor was conveyed without supplying a carbon source (in Comparative Examples 1 and 2, without supplying a nitrogen gas used instead of the 10% methane gas) into the cooling tube was taken as $T_\alpha$.

Example 2

The experiment was performed in the same manner as in Example 1, except that the flow rate of the carbon source was 7 L per minute. $T_\alpha$ was 1100° C. and $T_\beta$ was 1050° C.

Example 3

The experiment was performed in the same manner as in Example 1, except that the flow rate of the carbon source was 6 L per minute. $T_\alpha$ was 1100° C. and $T_\beta$ was 1050° C.

Example 4

The experiment was performed in the same manner as in Example 1, except that the flow rate of the carbon source was 40 L per minute. $T_\alpha$ was 1100° C. and $T_\beta$ was 1024° C.

Example 5

The experiment was performed in the same manner as in Example 1, except that a mixed gas containing 3% propane in an argon gas was used as the carbon source. $T_\alpha$ was 1100° C. and $T_\beta$ was 1035° C.

Example 6

A carbon-coated metal powder was manufactured using the plasma device A. Silver was used as the metallic raw material, and the vaporization rate was 100 g per minute. Nitrogen gas was used as the carrier gas. The carrier gas was flowed through the cooling tube at 200 L per minute, and the metal concentration was controlled to 0.5 g/L. The 10% methane gas was used as the carbon source, the supply rate was 25 L per minute, and the temperature of the supplied carbon source was room temperature (25° C. to 30° C.). $T_\alpha$ was 750° C. and $T_\beta$ was 700° C.

Example 7

A carbon-coated metal powder was manufactured using the plasma device A. Copper was used as the metallic raw material, and the vaporization rate was 15 g per minute. Nitrogen gas was used as the carrier gas. The carrier gas was flowed through the cooling tube at 200 L per minute, and the metal concentration was controlled to 0.075 g/L. The 10% methane gas was used as the carbon source, the supply rate was 25 L per minute, and the temperature of the supplied carbon source was room temperature (25° C. to 30° C.). $T_\alpha$ was 920° C. and $T_\beta$ was 880° C.

Example 8

A carbon-coated metal powder was manufactured using the plasma device A. An alloy of nickel and copper (the content of copper was 2 wt. %) was used as the metallic raw material, and the vaporization rate was 10 g per minute. Nitrogen gas was used as the carrier gas. The carrier gas was flowed through the cooling tube at 200 L per minute, and the metal concentration was controlled to 0.05 g/L. The 10% methane gas was used as the carbon source, the supply rate was 25 L per minute, and the temperature of the supplied carbon source was room temperature (25° C. to 30° C.). $T_\alpha$ was 1080° C. and $T_\beta$ was 1035° C.

Example 9

A carbon-coated metal powder was manufactured using the plasma device A. An alloy of nickel and copper (content ratio of copper was 20 wt. %) was used as the metallic raw material, and the vaporization rate was 12 g per minute. Nitrogen gas was used as the carrier gas. The carrier gas was flowed through the cooling tube at 200 L per minute, and the metal concentration was controlled to 0.06 g/L. The 10% methane gas was used as the carbon source, the supply rate was 25 L per minute, and the temperature of the supplied carbon source was room temperature (25° C. to 30° C.). $T_\alpha$ was 1075° C. and $T_\beta$ was 1020° C.

Example 10

A carbon-coated metal powder was manufactured using the plasma device 100 depicted in FIG. 2. A tube having a combination of an inner tube 112a (first indirect cooling zone 114) with an inner diameter of 8.9 cm, an inner tube 112b (second indirect cooling zone 115) with an inner diameter of 10.3 cm, and an inner tube 112c (direct cooling zone DC) with an inner diameter of 22 cm was used as the cooling tube 110. The length of the inner tube 112a was 3.5 cm, the length of the inner tube 112b was 46 cm, and the length of the inner tube 112c was 42.3 cm. A carbon source was supplied from the carbon source supply unit 111 having an inner diameter (supply port) of 1 cm at a position spaced apart by 10 cm from the upstream end of the second indirect cooling zone 115 in the downstream direction. The plasma device having the above-described configuration is referred to as plasma device B.

Nickel was used as the metallic raw material, and the vaporization rate was 85 g per minute. Nitrogen gas was used as the carrier gas. The carrier gas was flowed through the cooling tube at 750 L per minute, and the metal concentration was controlled to 0.11 g/L. The 10% methane gas was used as the carbon source, the supply rate was 20 L per minute, and the temperature of the supplied carbon source was room temperature (25° C. to 30° C.). $T_\alpha$ was 1780° C. and $T_\beta$ was 1500° C.

Example 11

A carbon-coated metal powder was manufactured using the plasma device B. Nickel was used as the metallic raw material, and the vaporization rate was 50 g per minute. Nitrogen gas was used as the carrier gas. The carrier gas was flowed through the cooling tube at 750 L per minute, and the metal concentration was controlled to 0.07 g/L. A mixed gas containing 3% methane in an argon gas was used as the carbon source, the supply rate was 103 L per minute, and the temperature of the supplied carbon source was room temperature (25° C. to 30° C.). $T_\alpha$ was 1650° C. and $T_\beta$ was 1380° C.

Example 12

A carbon-coated metal powder was manufactured using the plasma device 100 depicted in FIG. 2. A tube having a combination of an inner tube 112a (first indirect cooling zone 114) with an inner diameter of 8.9 cm, an inner tube 112b (second indirect cooling zone 115) with an inner diameter of 22 cm, and an inner tube 112c (direct cooling zone DC) with an inner diameter of 22 cm was used as the cooling tube 110. The length of the inner tube 112a was 10.3 cm, the length of the inner tube 112b was 22.5 cm, and the length of the inner tube 112c was 44.3 cm. A carbon source was supplied from the carbon source supply unit 111 having an inner diameter (supply port) of 1 cm at a position apart by 11 cm from the upstream end of the second indirect cooling zone 115 in the downstream direction.

Nickel was used as the metallic raw material, and the vaporization rate was 85 g per minute. Nitrogen gas was used as the carrier gas. The carrier gas was flowed through the cooling tube at 750 L per minute, and the metal concentration was controlled to 0.11 g/L. The 10% methane gas was used as the carbon source, the supply rate was 20 L per minute, and the temperature of the supplied carbon source was room temperature (25° C. to 30° C.). $T_\alpha$ was 1780° C. and $T_\beta$ was 1470° C.

Example 13

A carbon-coated metal powder was manufactured using the plasma device 100 depicted in FIG. 2. A tube having a combination of an inner tube 112a (first indirect cooling zone 114) with an inner diameter of 10.3 cm, an inner tube 112b (second indirect cooling zone 115) with an inner diameter of 12.8 cm, and an inner tube 112c (direct cooling zone DC) with an inner diameter of 36.9 cm was used as the cooling tube 110. The length of the inner tube 112a was 24.5 cm, the length of the inner tube 112b was 45 cm, and the length of the inner tube 112c was 54.7 cm. A carbon source was supplied from the carbon source supply unit 111 having an inner diameter (supply port) of 1.9 cm at a location spaced apart by 10 cm from the upstream end of the second indirect cooling zone 115 in the downstream direction.

Nickel was used as the metallic raw material, and the vaporization rate was 85 g per minute. Nitrogen gas was used as the carrier gas. The carrier gas was flowed through the cooling tube at 850 L per minute, and the metal concentration was controlled to 0.10 g/L. The 10% methane gas was used as the carbon source, the supply rate was 20 L per minute, and the temperature of the supplied carbon source was room temperature (25° C. to 30° C.). $T_\alpha$ was 1620° C. and $T_\beta$ was 1340° C.

Comparative Example 1

The experiment was performed in the same manner as in Example 1, except that nitrogen gas was used instead of the carbon source (10% methane gas) as a supplied material from the carbon source supply unit 111. $T_\alpha$ and $T_\beta$ each were 1100° C.

Comparative Example 2

The experiment was performed in the same manner as in Example 6, except that the carbon source supply unit 111 was provided in the direct cooling zone DC, rather than in the second indirect cooling zone 115, and nitrogen gas was supplied instead of the carbon source (10% methane gas) into the direct cooling zone DC. $T_\alpha$ and $T_\beta$ each were 350° C.

Comparative Example 3

The experiment was performed in the same manner as in Example 1, except that the carbon source supply unit 111 was provided in the reaction vessel 101, rather than in the second indirect cooling zone 115, and the carbon source was supplied into the reaction vessel 101. As mentioned hereinabove, at a point of time at which the metal vapor in the carrier gas is introduced from the reaction vessel 101 into the indirect cooling zone IC, the temperature is, for example, 5000 K. Therefore, $T_\alpha$ can be assumed to be equal to or higher than 5000 K. Further, since the interior of the reaction vessel 101 is continuously heated, $T_\beta$ also can be assumed to be equal to or higher than 5000 K.

Comparative Example 4

The experiment was performed in the same manner as in Example 1, except that the carbon source supply unit 111 was provided in the direct cooling zone DC, rather than in the second indirect cooling zone 115, and the carbon source was supplied into the direct cooling zone DC. $T_\alpha$ and $T_\beta$ each were 350° C.

Comparative Example 5

The experiment was performed in the same manner as in Example 1, except that the carbon source supply unit 111 was not provided, that is, the carbon source was not supplied. The temperature at the location where $T_\alpha$ and $T_\beta$ were measured in Example 1 was 1100° C.

Evaluation of Carbon-Coated Metal Powder

Figure 3:
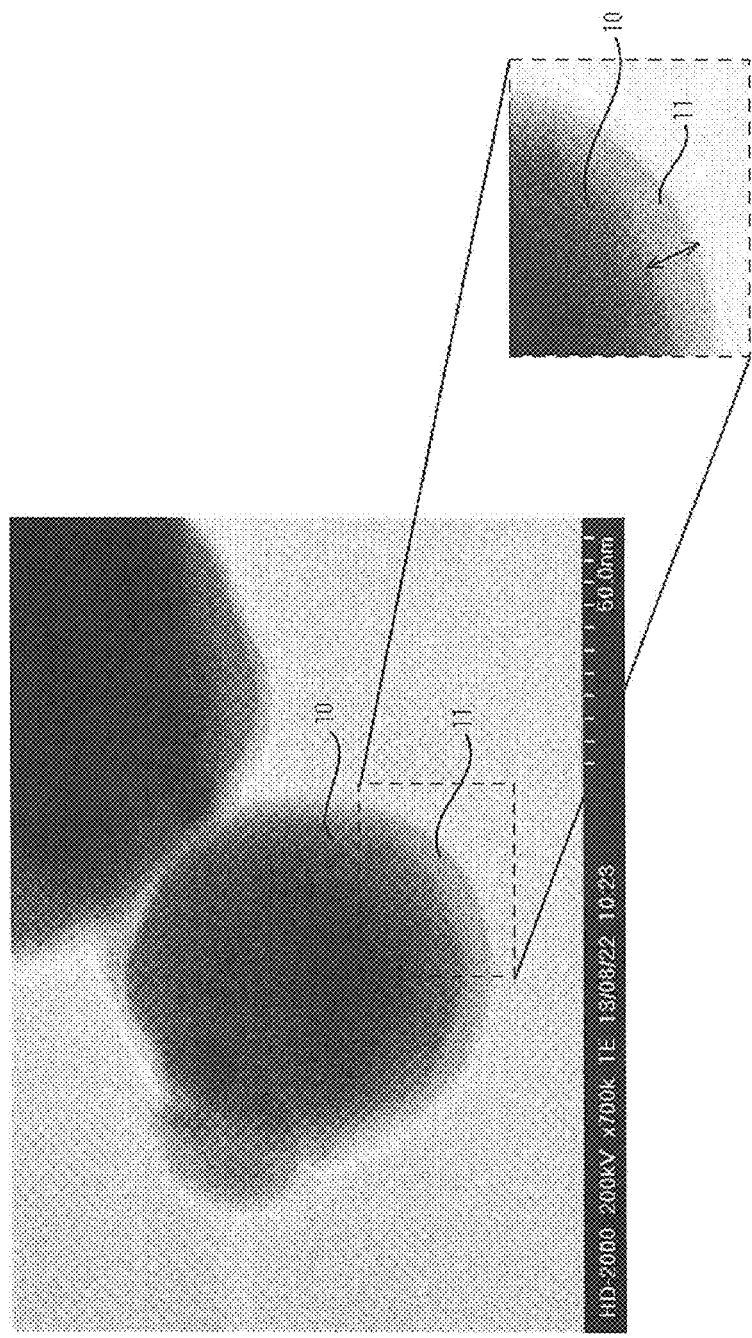
FIG. 3 is a TEM (transmission electron microscope) image of the carbon-coated metal powder obtained in Example 1.
Figure 6:
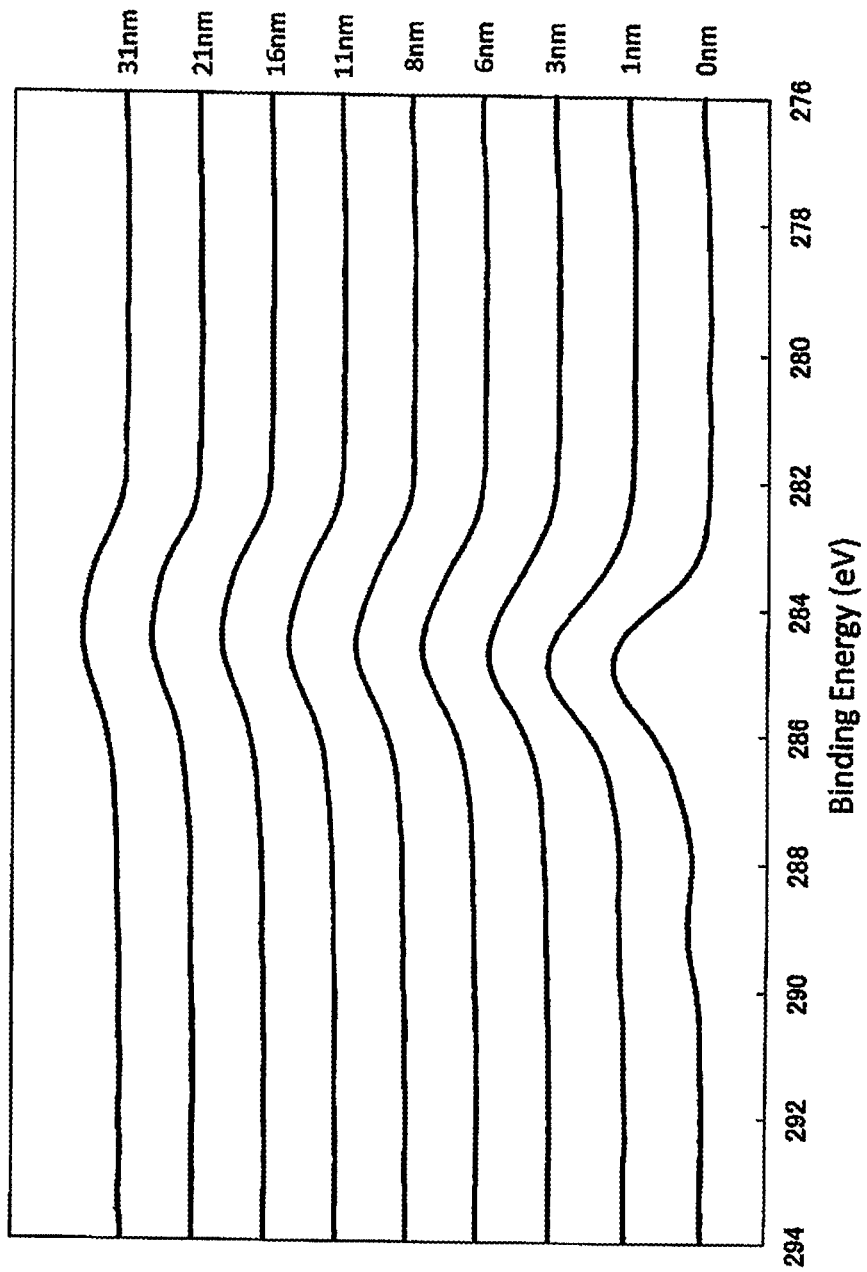
FIG. 6 shows the change in intensity of a is peak of carbon with the argon ion etching depth in the results of surface analysis measured by ESCA within a binding energy range of 276 eV to 294 eV for the carbon-coated metal powder obtained in Example 5.
Figure 7:
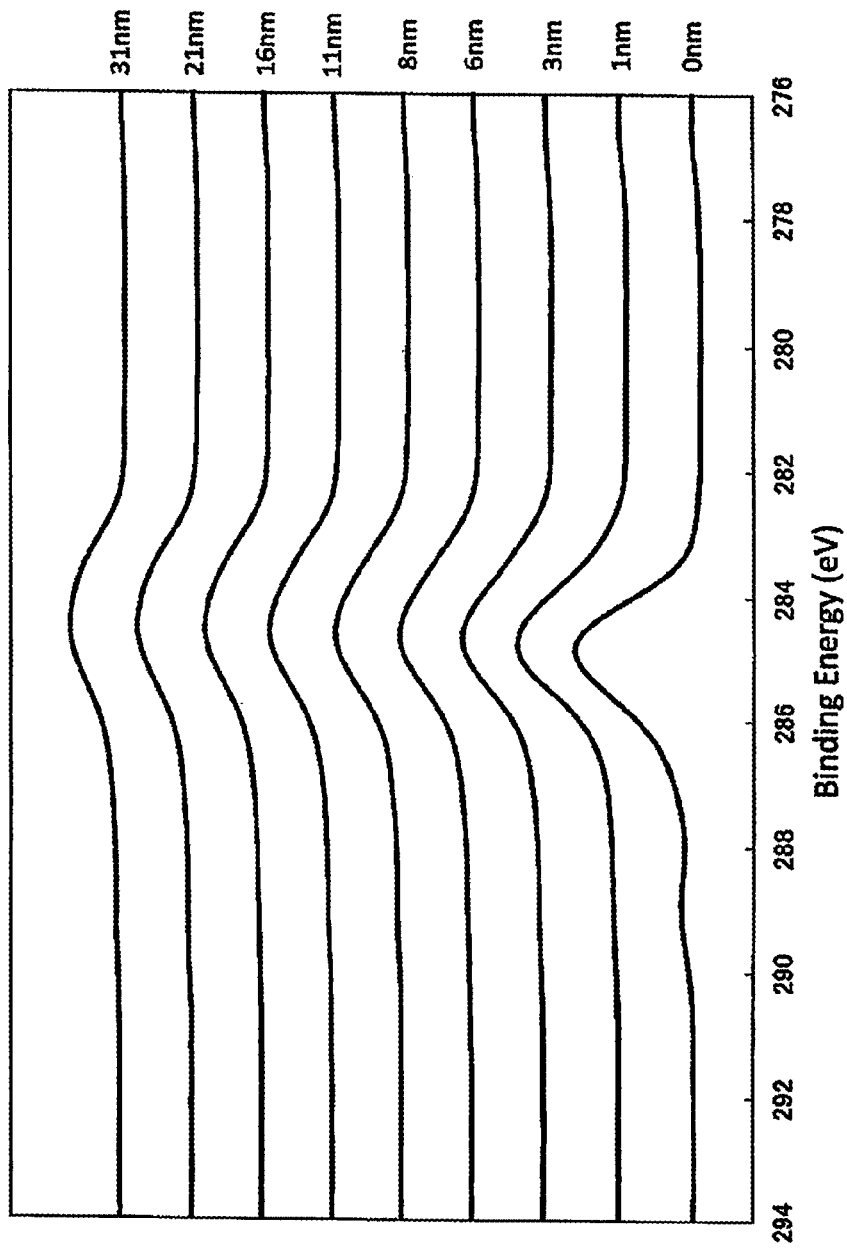
FIG. 7 shows the change in intensity of a is peak of carbon with the argon ion etching depth in the results of surface analysis measured by ESCA within a binding energy range of 276 eV to 294 eV for the carbon-coated metal powder obtained in Example 8.
Figure 8:
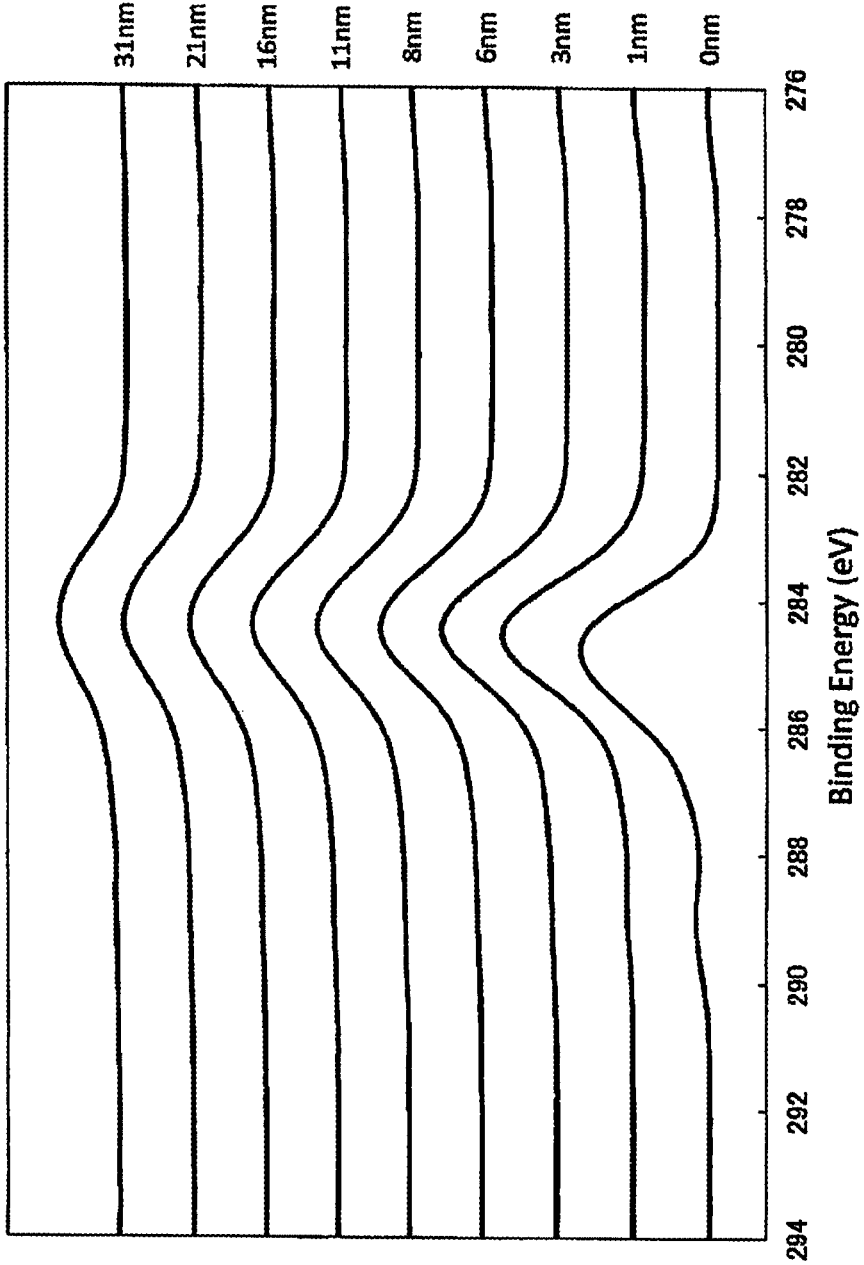
FIG. 8 shows the change in intensity of a is peak of carbon with the argon ion etching depth in the results of surface analysis measured by ESCA within a binding energy range of 276 eV to 294 eV for the carbon-coated metal powder obtained in Example 11.
Figure 9:
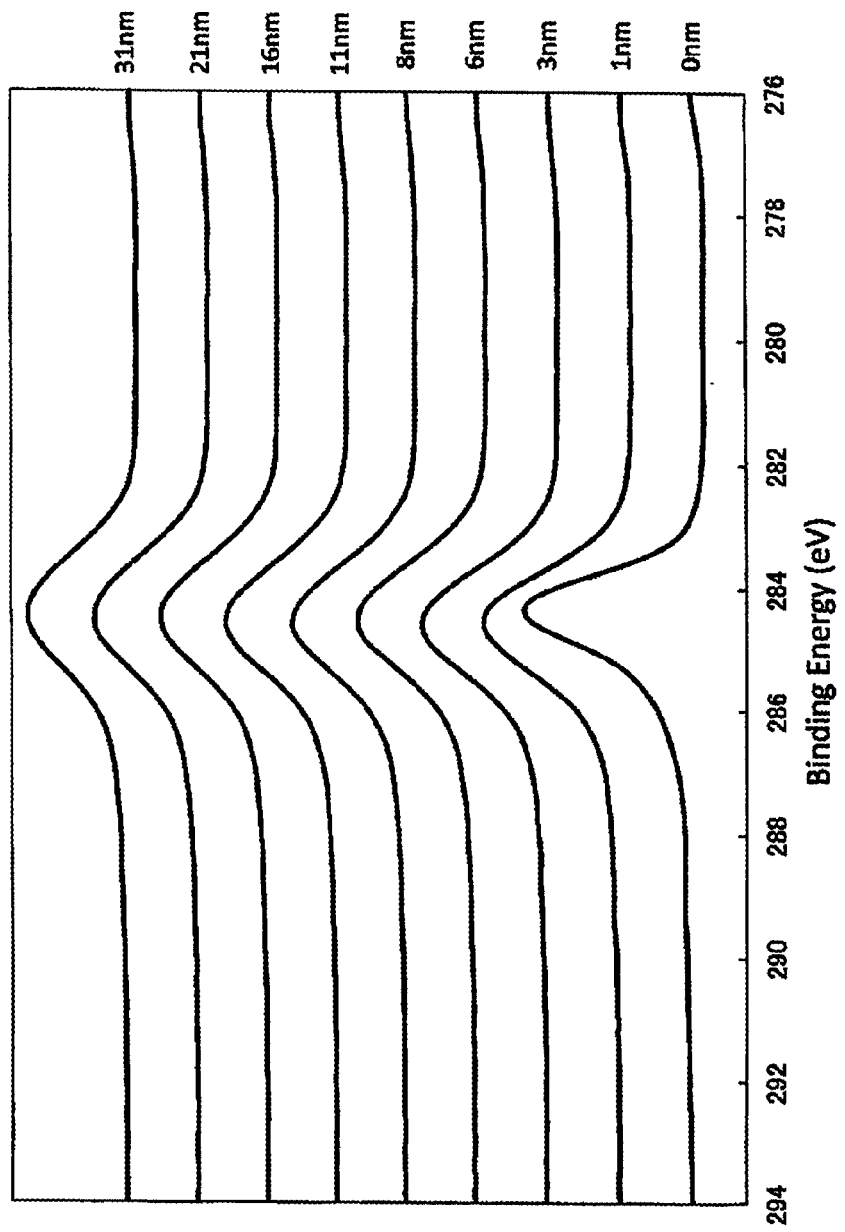
FIG. 9 shows the change in intensity of a is peak of carbon with the argon ion etching depth in the results of surface analysis measured by ESCA within a binding energy range of 276 eV to 294 eV for the carbon-coated metal powder obtained in Comparative Example 3.

The average particle size, SD value, carbon content, contents of impurities, and thickness of the carbon coating film were determined for each of the carbon-coated metal powders obtained in Examples 1 to 13 and Comparative Examples 1 to 5. The contents of oxygen, sulfur, and chlorine were determined as the contents of impurities. The results are shown in Table 1.

carbon-coated metal powder of Example 1. In FIG. 3, a dark portion is the metal particles 10 and a somewhat light portion is the carbon coating film 11. The thickness of the carbon coating film 11 is the length from the boundary between the dark portion and the light portion to the outer circumference of the light portion (in FIG. 3, the length of the portion shown by an arrow). In Table 1 the average value obtained by measuring the lengths at 20 random locations for one particle is presented as "thickness of carbon coating film".

The TMA shrinkage percentages were also determined for the carbon-coated metal powders of Examples 1 to 5 and 8 to 13 and Comparative Examples 1 and 3 to 5. The results are shown in Table 2. The TMA charts obtained by measurements in Examples 1 to 5, 8, and 11 and Comparative Examples 1 and 3 to 5 are shown in FIGS. 4 and 5.

TABLE 1

| | | | | | Contents of impurities | | | |
|---|---|---|---|---|---|---|---|---|
| | Average particle size (nm) | SD value | Specific surface area (m²/g) | Carbon content (wt. %) | Oxygen content (wt. %) | Oxygen content per specific surface area of 1 m²/g (ppm) | Sulfur content (wt. %) | Chlorine content (wt. %) | Thickness of carbon coating film (nm) |
| Example 1 | 190 | 0.88 | 8.83 | 2.68 | 0.25 | 283 | N.D | N.D. | 10 |
| Example 2 | 260 | 0.92 | 5.1 | 1.20 | 0.01 | 20 | N.D. | N.D. | 5 |
| Example 3 | 260 | 1.05 | 6.63 | 0.83 | 0.19 | 287 | N.D. | N.D. | 4 |
| Example 4 | 220 | 0.97 | 6.45 | 3.40 | 0.49 | 760 | N.D. | N.D. | 14 |
| Example 5 | 200 | 0.94 | 7.14 | 1.22 | 0.17 | 238 | N.D. | N.D. | 5 |
| Example 6 | 180 | 0.96 | 3.1 | 3.20 | 0.02 | 65 | N.D. | N.D. | 6 |
| Example 7 | 290 | 0.98 | 2.56 | 1.80 | 0.28 | 1094 | N.D. | N.D. | 9 |
| Example 8 | 210 | 0.96 | 6.98 | 1.52 | 0.22 | 315 | N.D. | N.D. | 11 |
| Example 9 | 235 | 0.96 | 6.97 | 1.61 | 0.21 | 301 | N.D. | N.D. | 11 |
| Example 10 | 218 | 1.09 | 4.47 | 1.80 | 0.04 | 89 | N.D. | N.D. | 8 |
| Example 11 | 183 | 1.13 | 5.51 | 2.22 | 0.17 | 309 | N.D. | N.D. | 9 |
| Example 12 | 220 | 1.15 | 8.09 | 1.85 | 0.05 | 62 | N.D. | N.D. | 8 |
| Example 13 | 212 | 1.07 | 5.24 | 1.78 | 0.06 | 115 | N.D. | N.D. | 8 |
| Comparative Example 1 | 330 | 1.51 | 4.53 | N.D. | 1.80 | 3974 | N.D. | N.D. | N.D. |
| Comparative Example 2 | 200 | Unmeasurable because of considerable aggregation | — | N.D. | 0.13 | — | N.D. | N.D. | N.D. |
| Comparative Example 3 | 322 | 1.54 | 4.95 | 3.40 | 0.29 | 586 | N.D. | N.D. | 11 |
| Comparative Example 4 | 336 | 1.53 | 5.05 | 0.12 | 1.68 | 3327 | N.D. | N.D. | N.D. |
| Comparative Example 5 | 341 | 1.58 | 5.02 | N.D. | 1.80 | 3586 | N.D. | N.D. | N.D. |

N.D.: Non-detectable

The average particle size and SD value were determined in the following manner. The 10% value, 50% value, and 90% value (referred to hereinbelow as "D10", "D50", and "D90", respectively) in the volume-based cumulative fraction in the particle size distribution measured using a laser diffraction type particle size distribution analyzer (LA-920, manufactured by HORIBA, Ltd.) were determined for the obtained carbon-coated metal powders. The average particle size refers to D50. Further, (D90–D10)/(D50) was determined as an indicator of particle size distribution and taken as the SD value. The content of carbon and content of sulfur were measured using a carbon/sulfur analyzer (EMIA-320V, manufactured by HORIBA, Ltd.). The content of oxygen was measured using a nitrogen/oxygen analyzer (EMGA-920, manufactured by HORIBA, Ltd.). The content of chlorine was measured by a titration method.

The thickness of the carbon coating film was determined from the observation image of the carbon-coated metal powder which was observed under a TEM (HD-2000, manufactured by HITACHI, Ltd.). FIG. 3 is a TEM image of the

TABLE 2

| | | Temperature width of 200° C | | | | |
|---|---|---|---|---|---|---|
| | $X_{MAX}$ (%) | Temperature range (° C.) | $X_{200° C.}$ (%) | X (%) | $X'_{MAX}$ (%) | X' (%) |
| Example 1 | 6.80 | 1000.0-1200.0 | 2.07 | 30.4 | 1.01 | 14.8 |
| Example 2 | 15.0 | 650.0-850.0 | 4.93 | 32.9 | 1.64 | 11.0 |
| Example 3 | 19.2 | 599.9-799.9 | 7.79 | 40.6 | 3.26 | 17.0 |
| Example 4 | 6.71 | 599.9-799.9 | 1.96 | 29.2 | 0.90 | 13.5 |
| Example 5 | 12.8 | 700.0-900.0 | 5.15 | 40.2 | 1.26 | 9.9 |
| Example 8 | 12.2 | 700.0-900.0 | 5.14 | 42.1 | 1.92 | 15.8 |
| Example 9 | 16.3 | 450.1-650.1 | 4.69 | 28.8 | 2.83 | 17.3 |
| Example 10 | 6.42 | 700.0-900.0 | 2.21 | 34.4 | 1.12 | 17.5 |
| Example 11 | 3.73 | 737.4-937.4 | 1.07 | 28.7 | 0.77 | 20.8 |
| Example 12 | 6.71 | 550.0-750.0 | 2.18 | 32.5 | 0.90 | 13.5 |
| Example 13 | 6.95 | 1000.0-1200.0 | 2.73 | 39.3 | 0.63 | 9.01 |

TABLE 2-continued

|  | X$_{MAX}$ (%) | Temperature range (° C.) | Temperature . width of 200° C | | | |
|---|---|---|---|---|---|---|
|  |  |  | X$_{200° C.}$ (%) | X (%) | X'$_{MAX}$ (%) | X' (%) |
| Comparative Example 1 | 17.7 | 467.7-667.7 | 10.6 | 59.9 | 6.23 | 35.2 |
| Comparative Example 3 | 5.74 | 220.0-420.0 | 1.81 | 31.6 | 2.22 | 38.7 |
| Comparative Example 4 | 18.3 | 390.0-590.0 | 12.2 | 66.7 | 6.57 | 35.9 |
| Comparative Example 5 | 19.5 | 400.0-600.0 | 11.9 | 61.0 | 7.51 | 38.5 |

The TMA shrinkage percentage was determined in the following manner. A TMA device (TMA4000S manufactured by BRUKER Corporation) was used for the measurements. A carbon-coated metal powder molded in a columnar shape with a diameter of 5 mm and a height of about 2 mm was used as a sample, the temperature was raised from room temperature to 1300° C. (in Example 8, to 1200° C.) at a rate of 5° C/rain in a nitrogen gas containing 4% of hydrogen, and the shrinkage percentage in the height direction of the sample was measured. In FIGS. 4 and 5, the shrinkage percentage (%) is a size variation percentage (%) in the height direction of the sample with respect to rising temperature. The negative value indicates shrinkage. The higher the absolute value of the negative value, the larger the shrinkage percentage (%).

Further, the shift amount of the peak position attributable to 1 s of a carbon atom from the particle surface toward the particle center was also determined by surface analysis by ESCA with respect to powders of Examples 1 to 5 and 8 to 13 and Comparative Examples 3 and 4. In Comparative Examples 1 and 5, carbon was not detected, as indicated in Table 1. Therefore, the surface analysis by ESCA in the vicinity of the peak position attributable to 1 s of a carbon atom was not performed. The results obtained are shown in Table 3. The results of surface analysis by ESCA relating to Examples 5, 8, and 11 and Comparative Example 3 are shown in FIGS. 6 to 9. FIGS. 6 to 9 show how argon ion etching changes the intensity of the is peak of carbon measured in a binding energy range of 276 eV to 294 eV.

TABLE 3

|  | Binding Energy(eV) | | Shift amount |
|---|---|---|---|
|  | Etching amount 1 nm | Etching amount 11 nm | (eV) |
| Example 1 | 284.662 | 284.456 | −0.206 |
| Example 2 | 284.730 | 284.452 | −0.278 |
| Example 3 | 284.817 | 284.517 | −0.300 |
| Example 4 | 285.351 | 284.849 | −0.502 |
| Example 5 | 284.871 | 284.547 | −0.324 |
| Example 8 | 284.759 | 284.488 | −0.271 |
| Example 9 | 284.877 | 284.654 | −0.223 |
| Example 10 | 284.652 | 284.478 | −0.174 |
| Example 11 | 284.526 | 284.326 | −0.200 |
| Example 12 | 284.834 | 284.652 | −0.182 |
| Example 13 | 284.704 | 284.604 | −0.100 |
| Comparative Example 3 | 284.569 | 284.593 | 0.024 |
| Comparative Example 4 | 284.454 | 284.500 | 0.046 |

The shift amount of the peak position was determined in the following manner. ESCA (ESCA-3400, manufactured by SHIMADZU Corporation) was used for measurements, and an Mg-Kα beam (1250 eV) was used as an incident X-ray source. The peak positions at etching depths of 1 nm and 11 nm were studied while performing argon ion etching, and the difference therebetween (shift amount) was determined. Where the shift amount is a negative value in Table 3, it means that the peak position at the etching depth of 11 nm has shifted to the low-energy side with respect to the peak position at an etching depth of 1 nm. Conversely, when the shift amount takes a positive value, it means that the shift is to the high-energy side.

Figure 10:
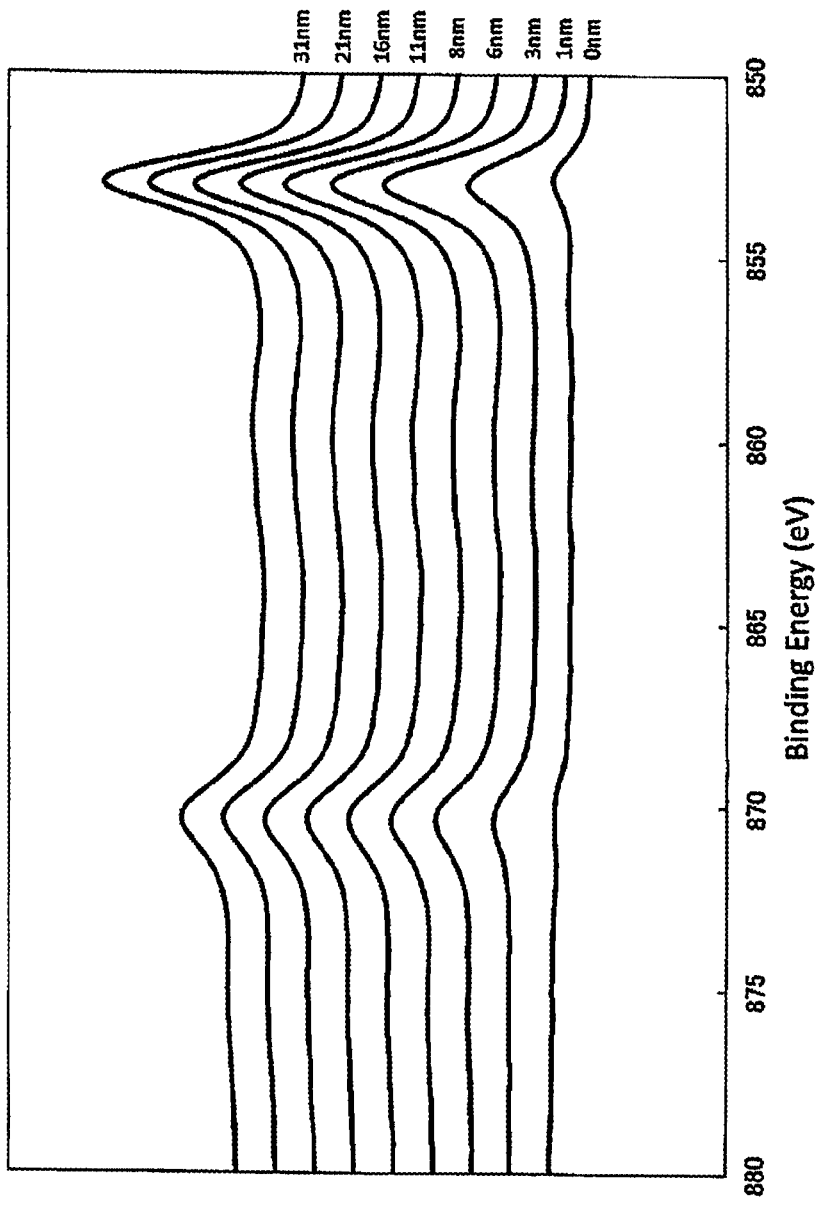
FIG. 10 shows the results of surface analysis measured by ESCA within a binding energy range of 850 eV to 880 eV for the carbon-coated metal powder obtained in Example 5.
Figure 11:
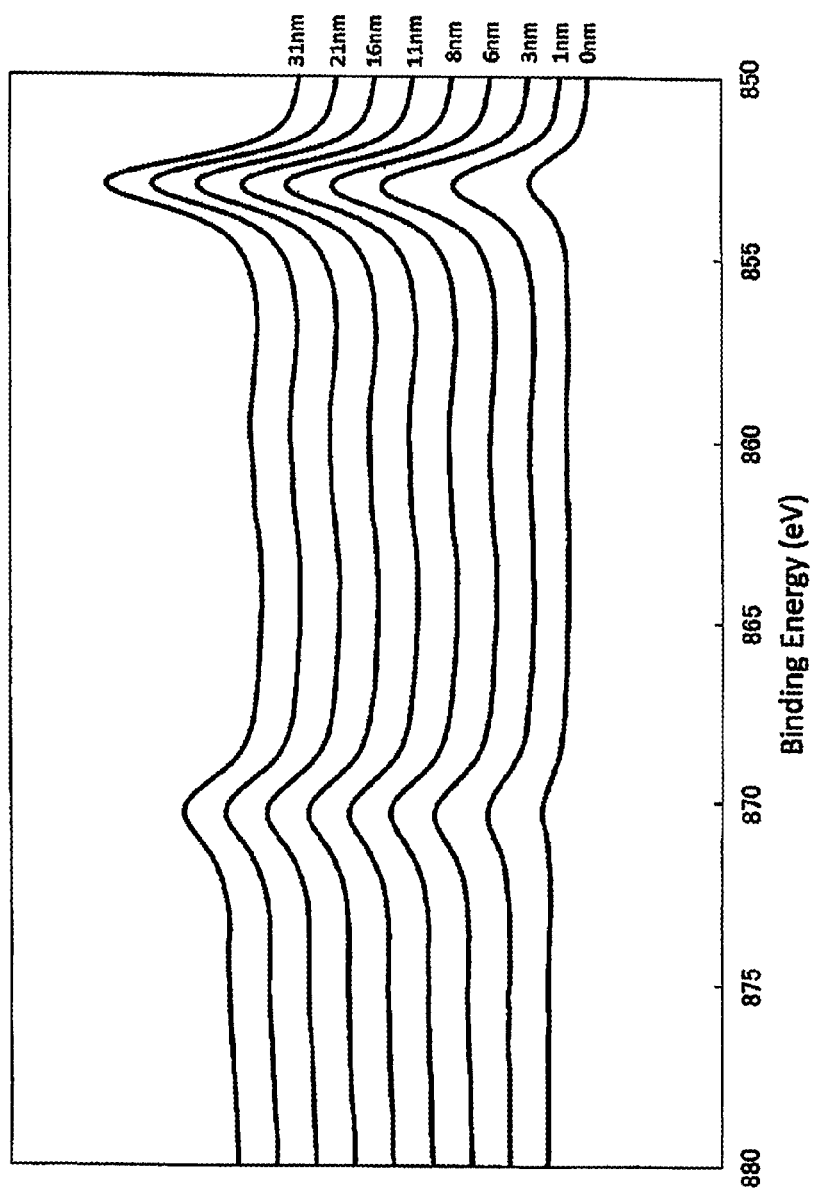
FIG. 11 shows the results of surface analysis measured by ESCA within a binding energy range of 850 eV to 880 eV for the carbon-coated metal powder obtained in Example 8.
Figure 12:
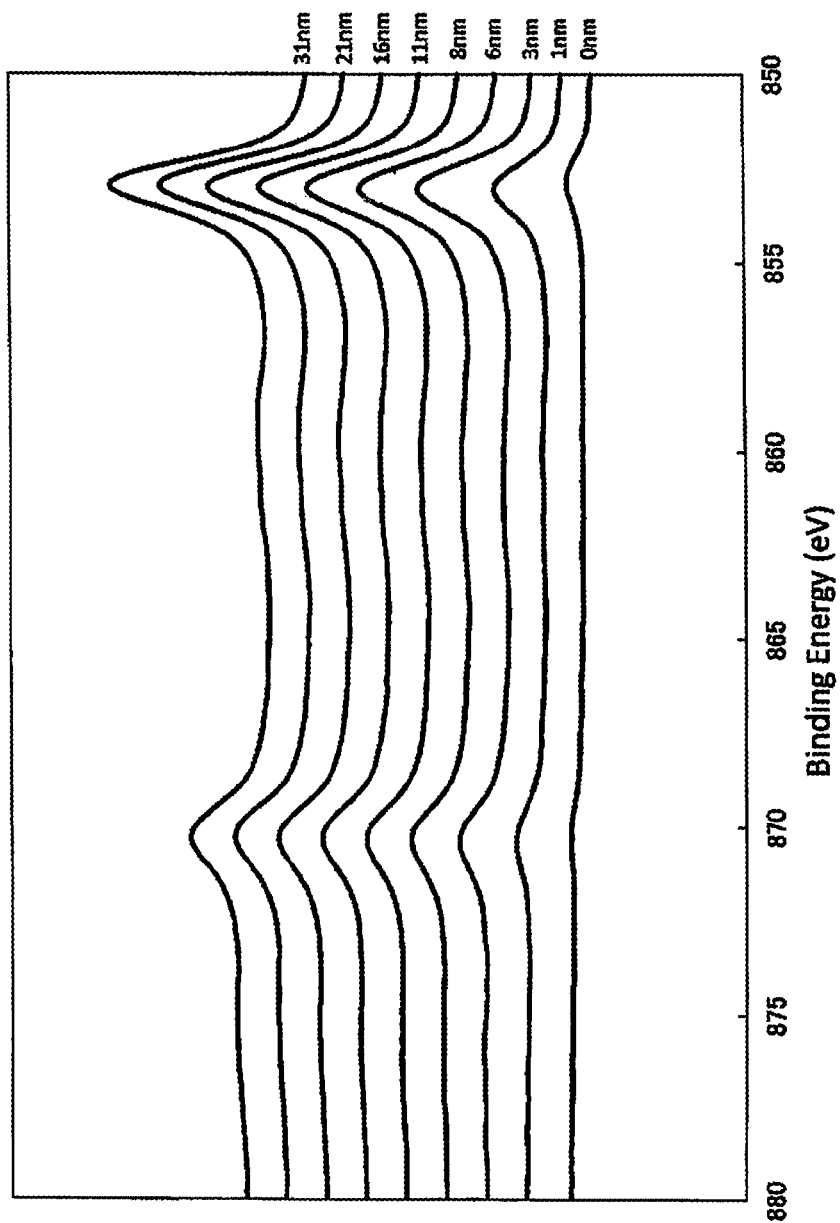
FIG. 12 shows the results of surface analysis measured by ESCA within a binding energy range of 850 eV to 880 eV for the carbon-coated metal powder obtained in Example 11.

The presence/absence of peaks attributable to nickel oxide and nickel hydroxide was also studied with respect to the powders of Examples 1 to 5 and 8 to 13 and Comparative Examples 1 and 3 to 5. The surface analysis results measured by ESCA within a binding energy range of 850 eV to 880 eV with respect to the powders of Examples 5, 8, and 11 are depicted in FIGS. 10 to 12. ESCA (ESCA-3400, manufactured by SHIMADZU Corporation) was used for measurements, and an Mg-Kα beam (1250 eV) was used as an incident X-ray source, in the same manner as described hereinabove.

Figure 13:
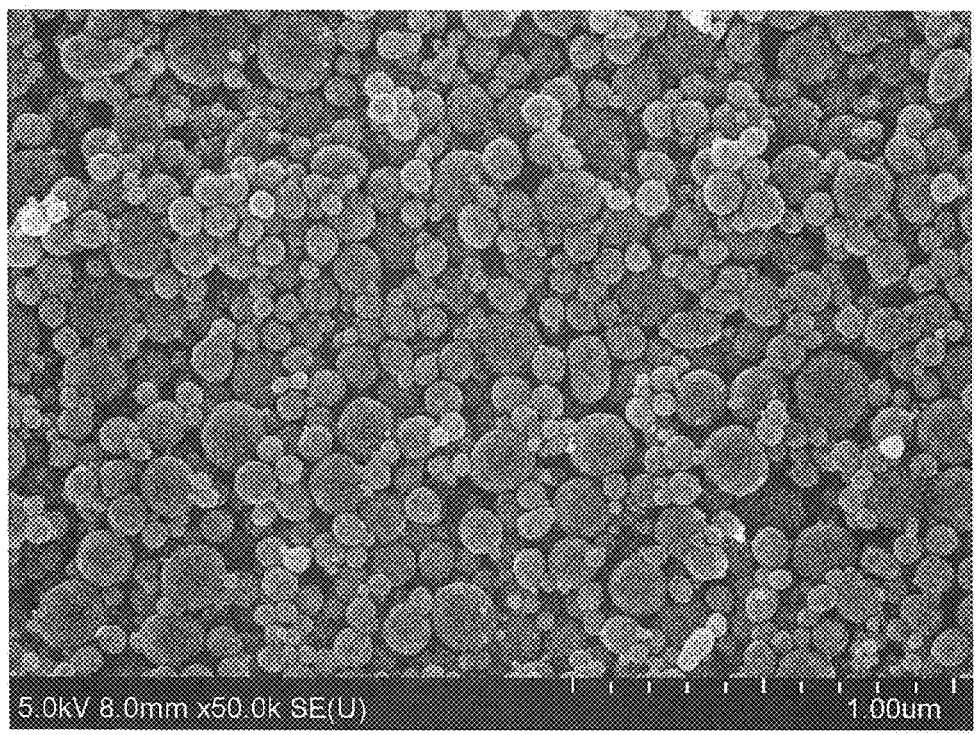
FIG. 13 is an SEM (scanning electron microscope) image of the carbon-coated metal powder obtained in Example 1.
Figure 14:
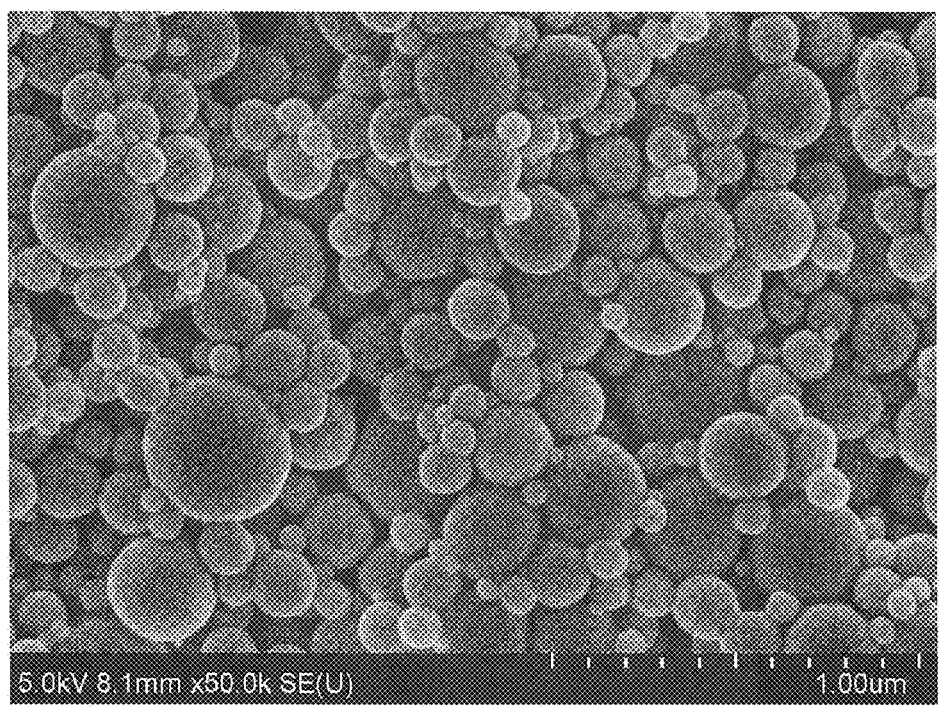
FIG. 14 is an SEM image of the carbon-coated metal powder obtained in Comparative Example 3.

SEM observations (SU-8020 manufactured by HITACHI, Ltd.) were also performed with respect to the powders of Example 1 and Comparative Example 3. FIGS. 13 and 14 show SEM images of carbon-coated metal powders obtained in Example 1 and Comparative Example 3, respectively.

The continuity of the fired film (coverage percentage of the fired film) and smoothness (surface roughness of the dry paste film) were evaluated with respect to the carbon-coated metal powder obtained in Example 1, the same powder subjected to heat treatment (Examples 1-1 to 1-4), and the carbon-coated metal powder obtained in Comparative Examples 3 and 5. The results are shown in Table 4.

TABLE 4

|  | Coverage percentage of fired film (%) | Surface roughness of dry paste film Ra/Rz (nm) |
|---|---|---|
| Example 1 | 93 | 14/144 |
| Example 1-1 | 98 | 16/138 |
| Example 1-2 | 98 | 16/142 |
| Example 1-3 | 97 | 17/138 |
| Example 1-4 | 94 | 28/151 |
| Comparative Example 3 | 90 | 33/256 |
| Comparative Example 5 | 42 | 37/270 |

The evaluations were performed in the following manner. A total of 100 parts by weight of the carbon-coated metal powder, 5 parts by weight of ethyl cellulose, and 95 parts by weight of dihydroterpineol were mixed, and kneaded using a three-roll mill to fabricate a conductive paste. The obtained conductive paste was coated on an alumina substrate to obtain a film thickness after firing of about 1 µm and fired at 1200° C. in a 1% $H_2/N_2$ atmosphere.

In Example 1-1, a carbon-coated metal powder was used that was obtained by subjecting the carbon-coated metal powder obtained in Example 1 to heat treatment for 2 hours at 180° C. under an air atmosphere. In Example 1-2, a carbon-coated metal powder was used that was obtained by subjecting the carbon-coated metal powder obtained in Example 1 to heat treatment for 10 hours at 180° C. under an air atmosphere. In Example 1-3, a carbon-coated metal powder was used that was obtained by subjecting the carbon-coated metal powder obtained in Example 1 to heat treatment for 2 hours at 300° C. under an air atmosphere. In Example 1-4, a carbon-coated metal powder was used that was obtained by subjecting the carbon-coated metal powder obtained in Example 1 to heat treatment for 2 hours at 1000° C. under a nitrogen atmosphere.

Figure 15:
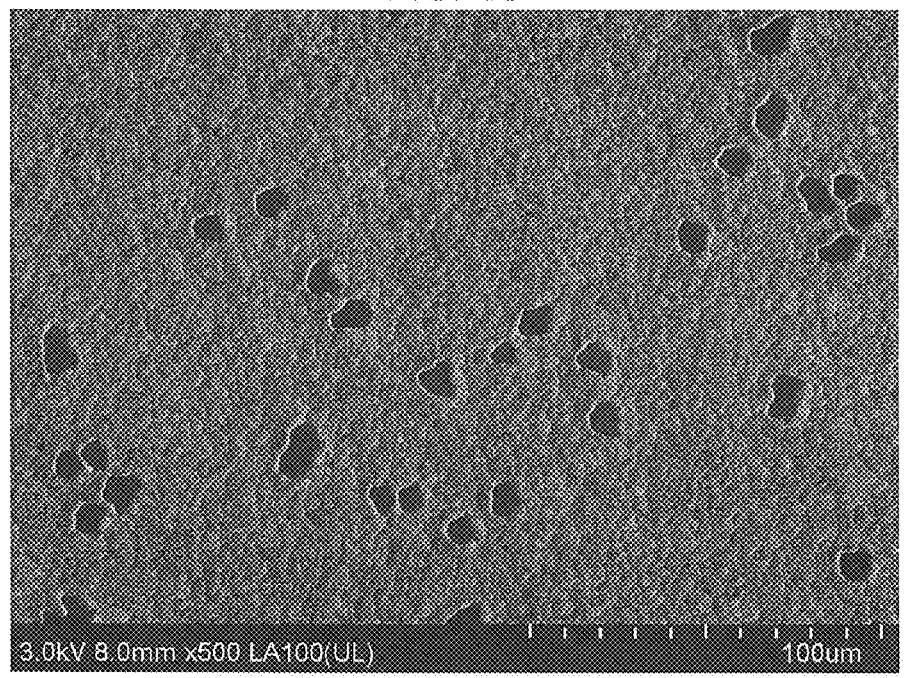
FIG. 15 is an SEM image of the fired film formed using the carbon-coated metal powder obtained in Example 1.
Figure 16:
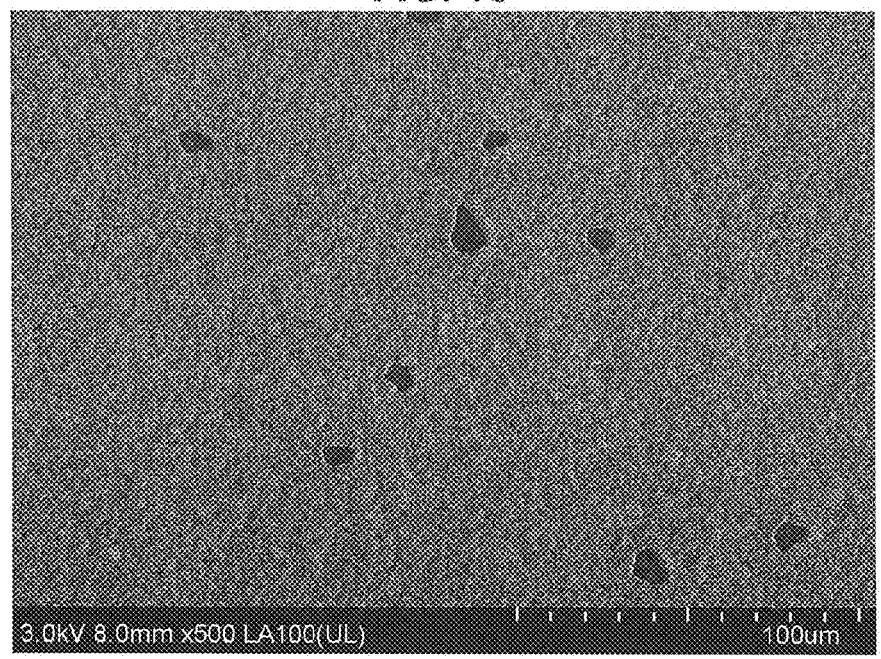
FIG. 16 is an SEM image of the fired film formed using the carbon-coated metal powder obtained in Example 1-1.
Figure 17:
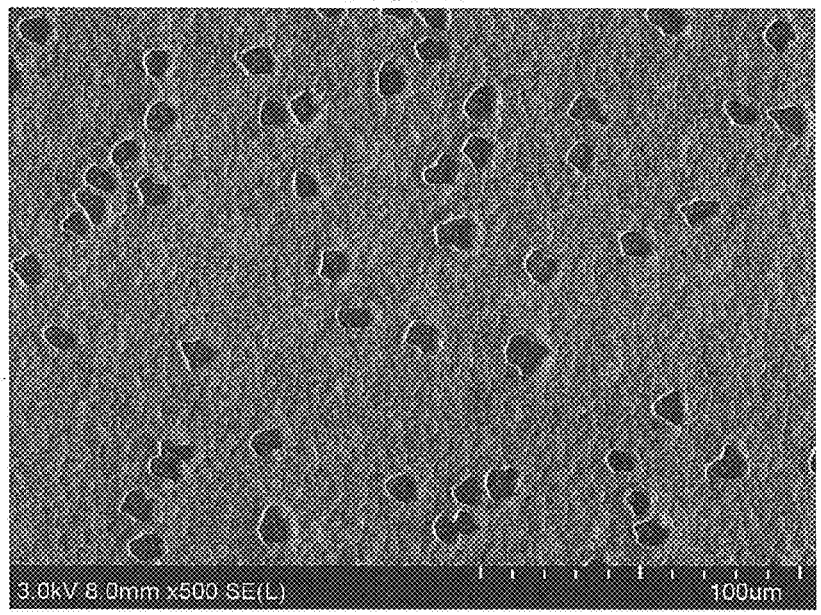
FIG. 17 is an SEM image of the fired film formed using the carbon-coated metal powder obtained in Comparative Example 3.
Figure 18:
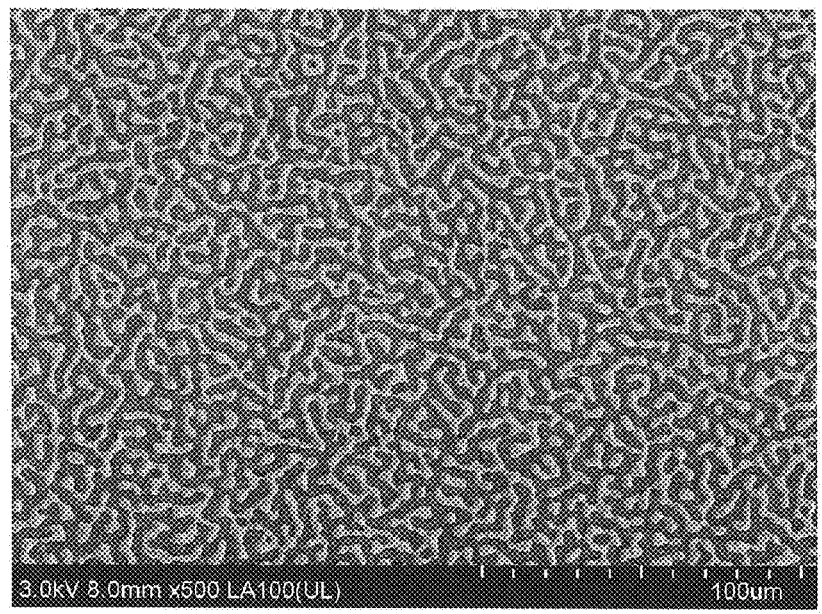
FIG. 18 is an SEM image of the fired film formed using the carbon-coated metal powder obtained in Comparative Example 5.

The fired films were observed with a SEM (SU-8020, manufactured by HITACHI, Ltd.), and the surface area ratio of the metal film and a portion where the metal film is not present in the specific surface area was evaluated as a continuity of the fired film. FIGS. 15 and 16 show SEM images of fired films obtained by using the carbon-coated metal powder obtained in Examples 1 and 1-1, and FIGS. 17 and 18 shows the images obtained in Comparative Examples 3 and 5.

Further, the conductive paste was coated on an alumina substrate such as to obtain a film thickness after drying of about 1 μm and dried for 2 hours at 150° C. under the air atmosphere. The surface roughness (Ra value and Rz value) of the dry paste film was determined using a surface roughness meter (SURFCORDER ET3000, manufactured by KOSAKA LABORATORY Ltd.). The surface roughness Ra and Rz shown in Table 4 are the arithmetic average roughness and ten-point average roughness stipulated by JIS B 0601-1994.

Conclusion

The above-described results demonstrate that the manufacturing method in accordance with the present invention makes it possible to obtain a carbon-coated metal powder with few impurities and a narrow particle size distribution. More specifically, comparing Example 1 with Comparative Example 5, which was the same as Example 1, except that no carbon source was supplied, it is clear that in Example 1 the content of oxygen was lower, the average particle size was less, and the SD value was less than in the comparative example. The same trend was also observed in comparing Example 1 with Comparative Example 1, in which a material other than the carbon source was supplied from the carbon source supply unit 111. The comparison of FIGS. 13 and 14 also demonstrates that in Example 1 the particle size was less and the particle size distribution was narrower than in Comparative Example 3.

Further, referring to FIG. 5, it is clear that in Comparative Examples 1, 4, and 5 in which the carbon coating film was not formed, rapid shrinkage started from a certain temperature and the shrinkage percentage became constant from about 600° C. Thus, it was found that in Comparative Examples 1, 4, and 5, an inflection point A appeared in the vicinity of 600° C. In other words, in Comparative Examples 1, 4, and 5, the sintering end temperature was in the vicinity of 600° C. Further, referring to FIG. 4, it is clear that in Examples 1 to 5, 8, and 11 in which the carbon coating film was formed, shrinkage gradually proceeded after the sintering had started, and the inflection point did not appear at least till a firing temperature (in this case, 1200° C.) of the conductive paste containing the carbon-coated metal powder obtained in Examples 1 to 5, 8, and 11. Since no rapid shrinkage thus occurred till the firing temperature, the fired film obtained by coating and firing the conductive paste containing the carbon-coated metal powder in accordance with the present invention had few holes (defects) and excelled in smoothness and denseness. This is also clear from the results shown in Table 4 and FIGS. 15 to 18.

It also follows from the results shown in Table 3, that in Examples 1 to 5 and 8 to 13, the shift amount had a negative value and the shift was to the low-energy side. In Comparative Examples 3 and 4, the shift amount had a positive value and the shift was to the high-energy side. Thus, in Comparative Examples 3 and 4, the nickel carbide layer was apparently practically not present.

Further, in Examples 1 to 5 and 8 to 13, peaks attributable to nickel oxide and nickel hydroxide were not present. In Comparative Examples 1, 4, and 5, peaks attributable to nickel oxide and nickel hydroxide were present.

Thus, in Examples 1 to 5 and 8 to 13, the surface state of the particles of the carbon-coated metal powder was good. Therefore, the improvement in shrinkage characteristics is sufficient, and when the conductive paste containing this carbon-coated metal powder is used for forming an internal conductor in a multilayer ceramic configuration, it is possible to obtain a multilayer electronic component which has a thin internal conductor layer that excels in denseness and continuity and has excellent characteristics without generating structural defects such as cracks and delamination. Further, as a result of forming a continuous carbon-coated layer, with nickel carbide being interposed, it is unlikely that physical forces acting during paste kneading, or the like, can cause defects such as peeling of the coating layer, etc. However, where the carbide interlayer is not present, adhesion at the interface of nickel and the coating layer is insufficient, defects are easily caused by mechanical forces, and the carbon coating cannot demonstrate a sufficient effect.

REFERENCE SIGNS LIST 10 metal particle
11 carbon coating film
100 plasma device
101 reaction vessel
102 plasma torch
103 plasma
104 cathode
105 anode
106 carrier gas supply unit
107 feed port
108 melt
110 cooling tube
IC indirect cooling zone
DC direct cooling zone
111 carbon source supply unit
112, 112a, 112b, 112c inner tubes
113 outer tube
114 first indirect cooling zone
115 second indirect cooling zone
120a, 120b virtual planes

What is claimed is:

1. A carbon-coated metal powder comprising a metal powder and a carbon coating film that covers the metal powder, wherein
when 10% value, 50% value, and 90% value in a volume-based cumulative fraction in particle size distribution measurements by a laser diffraction method are denoted by D10, D50, and D90, respectively, D50 is 300 nm or less, and an SD value represented by (D90-D10)/(D50) is 1.5 or less;
an oxygen content in a weight proportion of an oxygen component to the carbon-coated metal powder of a unit weight is 1500 ppm or less per specific surface area of 1 m²/g of the powder; and
X represented by Expression (1) is 50 or less when a TMA measurement is performed by raising a temperature from a room temperature to 1200° C. at a rate of 5° C./min in a nitrogen-hydrogen reducing atmosphere:

$$X(\%) = (X_{200°C}/X_{MAX}) \times 100 \qquad (1)$$

where $X_{MAX}$ is a maximum shrinkage percentage and $X_{200°\,C.}$ is a maximum value in differences, each of which is a difference between a maximum shrinkage percentage and a minimum shrinkage percentage in a temperature width of 200° C.

2. The carbon-coated metal powder according to claim 1, wherein when a temperature width of 200° C. giving the $X_{200°\,C.}$ is taken as not less than T° C. to not more than (T+200)° C., T° C.>400° C.

3. The carbon-coated metal powder according to claim 1, wherein X' represented by X' (%)=(X'$_{MAX}$/X$_{MAX}$)×100 is 30 or less, when X'$_{MAX}$ is a maximum shrinkage percentage in a range of from a room temperature to 400° C.

4. The carbon-coated metal powder according to claim 1, wherein the metal powder includes at least one of nickel and copper.

5. A carbon-coated metal powder comprising a nickel-based powder containing nickel as a main component, and a carbon coating film that covers the nickel-based powder, wherein
- an oxygen content in a weight proportion of an oxygen component to the carbon-coated metal powder of a unit weight is 1500 ppm or less per specific surface area of 1 m²/g of the powder; and
- in a surface analysis by ESCA, a peak position attributable to 1s of a carbon atom at a position of 11 nm from a particle surface toward a particle center is shifted to a low-energy side with respect to the peak position in a position at a position of 1 nm from the particle surface toward the particle center.

6. The carbon-coated metal powder according to claim 5, wherein in the surface analysis by ESCA, the peak position attributable to 1 s of a carbon atom at the position of 11 nm from the particle surface toward the particle center is shifted to a low-energy side by 0.08 eV or more with respect to the peak position at the position of 1 nm from the particle surface toward the particle center.

7. The carbon-coated metal powder according to claim 5, wherein peaks attributable to nickel oxide and nickel hydroxide are not present.

8. The carbon-coated metal powder according to claim 5, wherein
- when 10% value, 50% value, and 90% value in a volume-based cumulative fraction in particle size distribution measurements by a laser diffraction method are denoted by D10, D50, and D90, respectively, D50 is 300 nm or less, and an SD value represented by (D90-D10)/(D50) is 1.5 or less; and
- X represented by Expression (1) is 50 or less when a TMA measurement is performed by raising a temperature from a room temperature to 1200° C. at a rate of 5° C./min in a nitrogen-hydrogen reducing atmosphere:

$$X(\%)=(X_{200°\,C.}/X_{MAX})\times 100 \qquad (1)$$

where $X_{MAX}$ is a maximum shrinkage percentage and $X_{200°\,C.}$ is a maximum value in differences, each of which is a difference between a maximum shrinkage percentage and a minimum shrinkage percentage in a temperature width of 200° C.

9. The carbon-coated metal powder according to claim 5, wherein the nickel-based powder is a powder containing nickel in an amount of more than 98 wt. % or a nickel powder containing copper in an amount of 2 wt. % to 20 wt. %.

10. A conductive paste comprising the carbon-coated metal powder according to claim 1, a binder resin, and a solvent.

11. A multilayer electronic component having a plurality of internal conductor layers and a plurality of ceramic layers which are alternately stacked wherein the internal conductor layers are fired products of the conductive paste according to claim 10.

12. The multilayer electronic component according to claim 11, wherein a coverage percentage of the internal conductor layers is higher than 90%.

13. A conductive paste comprising the carbon-coated metal powder according to claim 5, a binder resin, and a solvent.

14. A multilayer electronic component having a plurality of internal conductor layers and a plurality of ceramic layers which are alternately stacked wherein the internal conductor layers are fired products of the conductive paste according to claim 13.

15. The multilayer electronic component according to claim 14, wherein a coverage percentage of the internal conductor layers is higher than 90%.

16. The carbon-coated metal powder according to claim 5, wherein the nickel-based powder contains nickel in an amount of more than 98 wt. %.

* * * * *